United States Patent
Schulte et al.

(10) Patent No.: US 6,283,302 B1
(45) Date of Patent: Sep. 4, 2001

(54) UNIBODY SCREEN STRUCTURE

(75) Inventors: David L. Schulte, Broussard, LA (US); Thomas C. Adams, Hockley, TX (US); Kenneth W. Seyffert, Houston, TX (US); David W. Largent, Cleveland, TX (US); Guy L. McClung, III, Spring, TX (US); Jeffrey E. Walker, Lafayette, LA (US); Hector M. Murray, Aberdeen (GB)

(73) Assignee: Tuboscope I/P, Inc., Houston, TX (US)

( * ) Notice: Subject to any disclaimer, the term of this patent is extended or adjusted under 35 U.S.C. 154(b) by 0 days.

(21) Appl. No.: 09/544,572

(22) Filed: Apr. 6, 2000

Related U.S. Application Data

(63) Continuation-in-part of application No. 09/228,572, filed on Jan. 11, 1999, which is a continuation-in-part of application No. 09/183,005, filed on Oct. 30, 1998, which is a continuation-in-part of application No. 09/090,554, filed on Jun. 4, 1998, which is a continuation-in-part of application No. 08/895,976, filed on Jul. 17, 1997, now Pat. No. 5,988,397, which is a continuation-in-part of application No. 08/786,515, filed on Jan. 21, 1997, now Pat. No. 5,971,159, and a continuation-in-part of application No. 08/598,566, filed on Feb. 12, 1996, now abandoned, said application No. 08/786,515, is a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, which is a continuation-in-part of application No. 08/056,123, filed on Apr. 30, 1993, now Pat. No. 5,385,669, and a continuation-in-part of application No. 08/105,696, filed on Aug. 12, 1993, now Pat. No. 5,392,925, and a continuation-in-part of application No. 08/504,495, filed on Jul. 20, 1995, now Pat. No. 5,598,930, and a continuation-in-part of application No. 08/598,566, filed on Feb. 12, 1996, now abandoned, which is a continuation-in-part of application No. 08/220,101, filed on Mar. 30, 1994, now Pat. No. 5,490,598.

(51) Int. Cl.$^7$ ..................................................... B07B 1/48
(52) U.S. Cl. ..................... 209/399; 209/363; 209/397; 209/403; 209/405

(58) Field of Search ......................................... 209/405, 408, 209/409, 399, 397, 403, 392, 363, 242, 313, 314, 319

(56) References Cited

U.S. PATENT DOCUMENTS

H1481    9/1995   Ray ............................................. 428/98

(List continued on next page.)

FOREIGN PATENT DOCUMENTS 2912228A   10/1980   (DE) .

(List continued on next page.)

OTHER PUBLICATIONS

U.S. application No. 08/282,983, filed Jul. 29, 1994, entitled "Shale Shaker Screens," co-owned with present invention/application.

(List continued on next page.)

*Primary Examiner*—Donald P. Walsh
*Assistant Examiner*—Daniel K Schlak
(74) *Attorney, Agent, or Firm*—Guy McClung

(57) ABSTRACT

A unibody structure for a screen assembly for a vibratory separator, and screens with such a structure, the unibody structure having, in certain aspects, an integral body member with a plurality of spaced-apart openings therethrough for sealingly abutting the shoulder support portion of an end of an adjacent screen defining fluid flow paths for screening and/or defining a plurality of spaced-apart supports for screening material, and the integral body member including side portions foldable to form one or two pairs of spaced-apart integral side members and/or the integral body member including two end portions foldable to form a pair of spaced-apart integral end members and/or a pair of spaced-apart ends. In certain aspects one of a pair of spaced-apart end portions is configured with a shoulder support portion and another end with a ledge portion.

18 Claims, 18 Drawing Sheets

U.S. PATENT DOCUMENTS

| | | |
|---|---|---|
| 40,242 | 10/1863 | Capell . |
| 236,416 | 1/1881 | Bourne . |
| 246,144 | 8/1881 | Keeler . |
| 268,491 | 12/1882 | Hubbell . |
| 275,190 | 4/1883 | Gilbert . |
| 275,340 | 4/1883 | Kimball . |
| 500,302 | 6/1893 | Stoecket et al. . |
| 516,673 | 3/1894 | Wilson . |
| 526,562 | 9/1894 | Cross . |
| 541,595 * | 6/1895 | Cross ................................. 209/397 |
| 560,858 | 5/1896 | Missroon . |
| 583,981 | 6/1897 | Plaisted . |
| 599,468 * | 2/1898 | Cross ................................. 209/397 |
| 607,598 | 7/1898 | Closz . |
| 777,317 | 12/1904 | Traylor . |
| 865,185 | 9/1907 | Kerrigan . |
| 948,222 | 2/1910 | Honabach . |
| 964,897 | 7/1910 | Bryant . |
| 966,578 | 8/1910 | Murphy et al. .................. 209/401 X |
| 984,866 | 2/1911 | Tate . |
| 1,082,612 | 12/1913 | Smith et al. . |
| 1,098,979 | 6/1914 | Schuchard . |
| 1,132,667 | 3/1915 | Milliot . |
| 1,139,041 | 5/1915 | Larson . |
| 1,193,273 * | 8/1916 | Lee ....................................... 209/397 |
| 1,242,982 | 10/1917 | Reynolds . |
| 1,248,081 | 11/1917 | Couch . |
| 1,250,768 | 12/1917 | Baumgartner ....................... 209/392 |
| 1,279,630 * | 9/1918 | Yoder et al. ......................... 209/399 |
| 1,344,747 | 6/1920 | Wright . |
| 1,359,426 | 11/1920 | Plaisted . |
| 1,397,339 | 11/1921 | Sturtevant . |
| 1,423,021 | 7/1922 | Reynolds . |
| 1,462,804 | 7/1923 | Evans . |
| 1,505,735 | 8/1924 | Stebbins . |
| 1,561,632 | 11/1925 | Woodward . |
| 1,614,586 | 10/1927 | Anderson et al. . |
| 1,626,774 | 5/1927 | Allan . |
| 1,678,941 | 7/1928 | Helman . |
| 1,713,143 | 5/1929 | Overstrom . |
| 1,716,758 | 6/1929 | Bland . |
| 1,778,558 * | 10/1930 | Kellogg .............................. 209/397 |
| 1,785,195 | 12/1930 | Hoes et al. . |
| 1,822,298 | 9/1931 | Kerrigan . |
| 1,879,377 | 9/1932 | McNeely . |
| 1,939,314 * | 12/1933 | Neifert et al. ....................... 209/397 |
| 1,950,861 | 3/1934 | O'Toole, Sr. . |
| 1,997,713 | 4/1935 | Boehm . |
| 1,997,740 | 4/1935 | Nickerson . |
| 2,015,139 * | 9/1935 | Dustam .............................. 209/397 |
| 2,052,467 | 8/1936 | Hermann ............................ 209/401 |
| 2,061,850 | 11/1936 | Roberts . |
| 2,082,513 | 6/1937 | Roberts . |
| 2,089,548 | 8/1937 | Frantz et al. . |
| 2,104,785 | 1/1938 | Akayson ............................. 210/384 |
| 2,190,262 | 2/1940 | Geist . |
| 2,251,909 | 8/1941 | Lindsay .............................. 210/149 |
| 2,274,700 | 3/1942 | Jenks . |
| 2,335,084 | 11/1943 | Rice .................................... 209/408 |
| 2,406,051 | 8/1946 | Weiss . |
| 2,462,878 | 3/1949 | Logue . |
| 2,480,320 | 8/1949 | Carrier ................................ 210/388 |
| 2,511,239 | 6/1950 | Behnke et al. ...................... 209/403 |
| 2,648,441 | 8/1953 | Soldan . |
| 2,667,975 | 2/1954 | Seaholm ............................. 210/152 |
| 2,670,079 | 2/1954 | Bette ................................... 209/405 |
| 2,677,462 | 5/1954 | Conkling ............................ 209/403 |
| 2,682,205 * | 6/1954 | Vincent .............................. 209/405 |
| 2,723,032 | 11/1955 | Gisler et al. . |
| 2,726,184 | 12/1955 | Cox et al. . |
| 2,774,477 | 12/1956 | Pollitz ................................. 209/403 |
| 2,800,227 | 7/1957 | Kiger .............................. 209/412 X |
| 2,813,629 | 11/1957 | Brugmann .......................... 209/403 |
| 2,827,169 | 3/1958 | Cusi . |
| 2,902,165 | 9/1959 | Imershein . |
| 2,929,454 | 3/1960 | Sprouse . |
| 2,973,865 | 3/1961 | Cibula ............................ 209/392 X |
| 2,980,208 | 4/1961 | Neumann . |
| 2,985,303 | 5/1961 | Wright . |
| 3,057,481 | 10/1962 | Pale .................................... 210/493 |
| 3,070,231 | 12/1962 | McCorkel et al. .................. 209/319 |
| 3,092,573 | 6/1963 | Lambert et al. .................... 209/403 |
| 3,165,473 | 1/1965 | Pall et al. ............................ 210/510 |
| 3,176,843 | 4/1965 | Hoskins et al. ..................... 209/403 |
| 3,243,943 | 4/1966 | Getzin ................................... 55/499 |
| 3,255,885 | 6/1966 | Burls .................................. 209/314 |
| 3,285,413 | 11/1966 | Taylor-Smith . |
| 3,339,731 * | 9/1967 | Merges et al. ...................... 209/399 |
| 3,458,978 | 8/1969 | Davis .................................... 55/499 |
| 3,465,413 | 9/1969 | Rosaen et al. ........................ 29/428 |
| 3,542,636 | 11/1970 | Wandel ............................... 161/114 |
| 3,565,251 * | 2/1971 | Pennington ........................ 209/405 |
| 3,574,103 | 4/1971 | Latkin .................................. 428/72 |
| 3,655,060 | 4/1972 | Hagdahl ............................. 210/493 |
| 3,679,057 | 7/1972 | Perez .................................. 210/223 |
| 3,716,138 | 2/1973 | Lumsden ............................ 209/401 |
| 3,747,770 | 7/1973 | Zentis ................................. 210/402 |
| 3,747,772 | 7/1973 | Brown ................................ 210/493 |
| 3,789,498 | 2/1974 | Cole ................................... 29/470.9 |
| 3,793,692 * | 2/1974 | Tate et al. ......................... 29/896.62 |
| 3,833,120 * | 9/1974 | Ogata ................................. 209/399 |
| 3,853,529 | 12/1974 | Boothe et al. ........................ 55/499 |
| 3,900,628 | 8/1975 | Stewart . |
| 3,929,642 | 12/1975 | Ennis et al. ......................... 210/113 |
| 3,970,549 | 7/1976 | Ennis et al. ......................... 209/341 |
| 4,019,987 | 4/1977 | Krashow ............................. 210/232 |
| 4,022,596 | 5/1977 | Pedersen .............................. 55/528 |
| 4,033,865 | 7/1977 | Derrick, Jr. ......................... 209/275 |
| 4,062,769 | 12/1977 | Simonson ........................... 209/399 |
| 4,065,382 | 12/1977 | Derrick, Jr. ......................... 209/313 |
| 4,075,106 | 2/1978 | Yamazaki ........................... 210/487 |
| 4,138,303 | 2/1979 | Taylor ................................ 156/264 |
| 4,190,527 * | 2/1980 | Spiller ................................ 209/363 |
| 4,380,494 | 4/1983 | Wilson ............................... 209/319 |
| 4,410,427 | 10/1983 | Wydeven ............................ 210/317 |
| 4,464,242 | 8/1984 | Boulton .............................. 204/253 |
| 4,472,473 | 9/1984 | Davis et al. ......................... 428/184 |
| 4,546,783 | 10/1985 | Lott .................................... 134/109 |
| 4,548,213 * | 10/1985 | Phillips et al. ........................ 460/90 |
| 4,575,421 | 3/1986 | Derrick et al. ...................... 209/397 |
| 4,582,597 | 4/1986 | Huber ................................. 204/313 |
| 4,589,983 | 5/1986 | Wydevan ............................ 210/317 |
| 4,617,122 | 10/1986 | Kruse et al. ...................... 210/493.3 |
| 4,634,535 | 1/1987 | Lott .................................... 210/780 |
| 4,678,578 | 7/1987 | Nodes et al. ........................ 210/445 |
| 4,696,751 | 9/1987 | Eifling ................................ 210/780 |
| 4,728,422 | 3/1988 | Bailey ................................ 210/314 |
| 4,758,333 * | 7/1988 | Masica et al. ...................... 209/397 |
| 4,769,968 | 9/1988 | Davis et al. ........................... 52/814 |
| 4,819,809 | 4/1989 | Derrick .............................. 209/275 |
| 4,820,407 | 4/1989 | Lilie ................................... 209/397 |
| 4,832,834 | 5/1989 | Baird, Jr. ............................ 209/397 |
| 4,857,176 | 8/1989 | Derrick et al. ...................... 209/392 |
| 4,882,044 | 11/1989 | Friessle ............................... 209/319 |
| 4,882,054 | 11/1989 | Derrick et al. ...................... 210/389 |
| 4,892,767 | 1/1990 | Freissle ................................ 428/52 |
| 4,940,500 | 7/1990 | Tadokoro et al. ................... 156/204 |
| 4,954,249 | 9/1990 | Gero et al. .......................... 209/273 |
| 5,028,474 | 7/1991 | Czaplicki ............................ 428/178 |
| 5,056,286 | 10/1991 | Bokor .................................. 52/483 |
| 5,084,178 | 1/1992 | Miller et al. ...................... 210/493.5 |

| | | | |
|---|---|---|---|
| 5,137,622 | 8/1992 | Souter | 209/403 |
| 5,139,154 | 8/1992 | Gero et al. | 209/273 |
| 5,162,143 | 11/1992 | Porter et al. | 428/179 |
| 5,167,740 | 12/1992 | Michaelis et al. | 156/73.1 |
| 5,211,291 | 5/1993 | Kelley et al. | 209/680 |
| 5,221,008 | 6/1993 | Derrick, Jr. et al. | 209/269 |
| 5,256,292 | 10/1993 | Cagle | 210/499 |
| 5,312,508 | 5/1994 | Chisholm | 156/292 |
| 5,330,057 | 7/1994 | Schiller et al. | 209/392 |
| 5,385,669 | 1/1995 | Leone, Sr. | 210/488 |
| 5,392,925 | 2/1995 | Seyffert | 209/405 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,490,598 | 2/1996 | Adams | 209/403 X |
| 5,614,094 | 3/1997 | Deister et al. | 210/388 |
| 5,636,749 | 6/1997 | Wojciechowski | 209/403 |
| 5,720,881 * | 2/1998 | Derrick et al. | 210/388 |
| 5,783,077 | 7/1998 | Bakula | 210/388 |
| 5,814,218 | 9/1998 | Cagle | 210/388 |
| 5,851,393 | 12/1998 | Carr et al. | 204/489 |
| 5,868,929 | 9/1999 | Derrick et al. | 210/388 |
| 5,876,552 | 3/1999 | Bakula | 156/308.2 |
| 5,921,399 | 7/1999 | Bakula et al. | 209/272 |
| 5,944,993 | 8/1999 | Derrick et al. | 210/388 |
| 5,950,841 | 9/1999 | Knox et al. | 209/315 |
| 5,958,236 | 9/1999 | Bakula | 210/388 |
| 5,967,336 | 10/1999 | Baltzer et al. | 209/403 |
| 5,984,107 | 11/1999 | Bleh | 209/320 |
| 5,992,641 | 11/1999 | Caldwell, Jr. | 209/273 |
| 6,000,556 | 12/1999 | Bakula | 210/388 |
| 6,000,558 | 12/1999 | Proulx et al. | 210/486 |
| 6,006,923 | 12/1999 | Helmy et al. | 209/397 |
| 6,019,228 | 2/2000 | Duggan | 209/408 |
| 6,053,331 | 4/2000 | Cravello | 210/388 |
| 6,053,332 * | 4/2000 | Bakula . | |

FOREIGN PATENT DOCUMENTS

| | | | |
|---|---|---|---|
| 3827259A | 4/1989 | (DE) . | |
| 8904477 U | 11/1989 | (DE) . | |
| 269877 | 4/1928 | (GB) | 8794/27 |
| 519680 | 6/1939 | (GB) . | |
| 823648 | 10/1957 | (GB) . | |
| 1412975 | 10/1973 | (GB) . | |
| 2161715B | 1/1983 | (GB) . | |
| 2124099A | 2/1983 | (GB) . | |
| 2161715A | 3/1984 | (GB) . | |
| 59-142818 | 1/1984 | (JP) . | |
| PCT/GB91/ 00957 | 6/1991 | (WO) . | |
| WO 9200133A | 1/1992 | (WO) . | |
| PCT/US94/ 00243 | 1/1994 | (WO) . | |
| WO 9415723A | 7/1994 | (WO) . | |
| WO 9611070A | 4/1996 | (WO) . | |
| PCT/EP96/ 03103 | 2/1997 | (WO) . | |
| WO 9703765A | 2/1997 | (WO) . | |
| WO 9523655A | 9/1998 | (WO) . | |

OTHER PUBLICATIONS

Pending U.S. application 08/220,101 filed, Mar. 30 1994, entitled "Screen For Vibrating Separator."

Amendment Under 37 CFR 1.115 in pending U.S. S.N. 08/220,101.

* cited by examiner

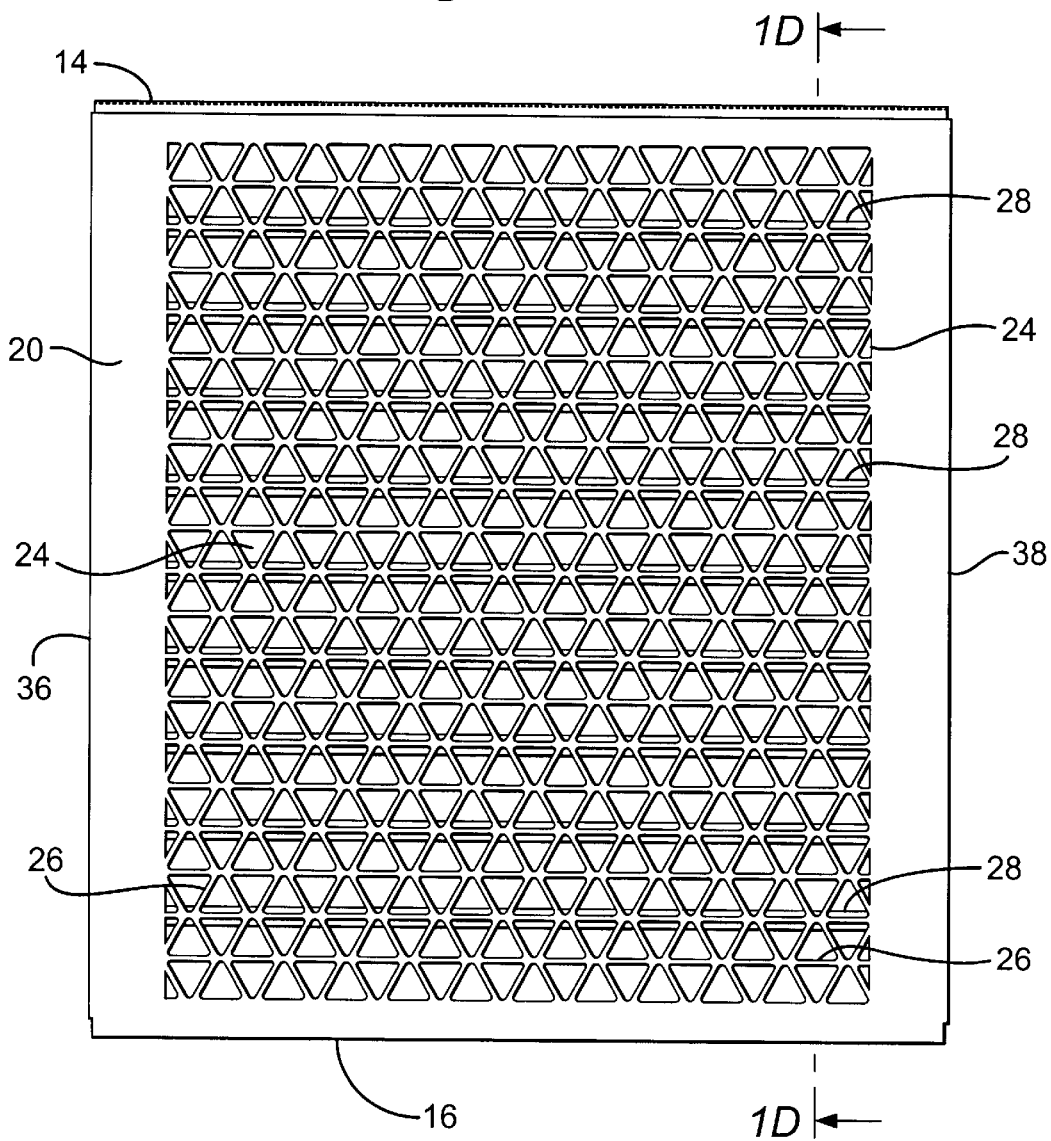

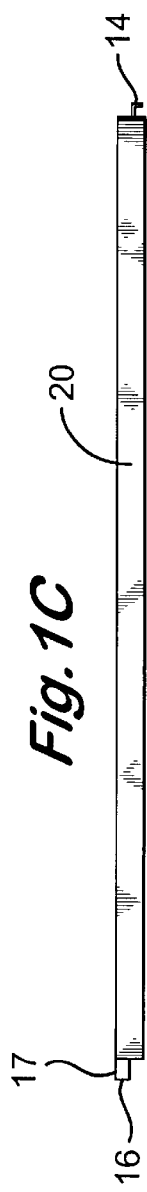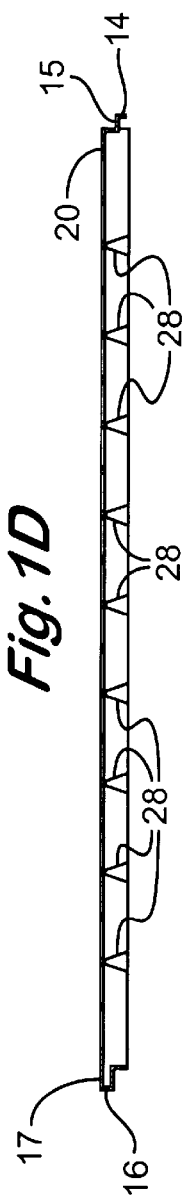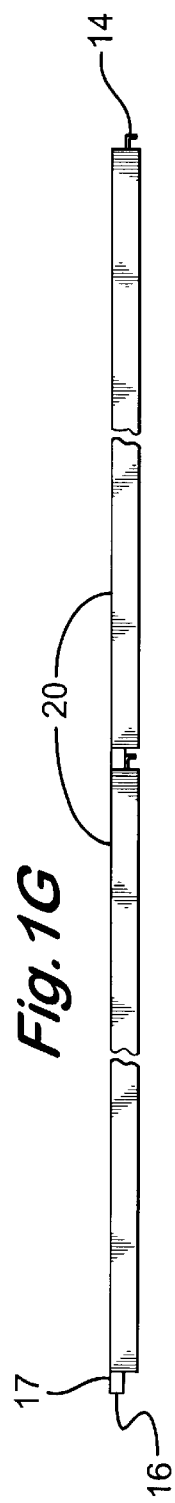

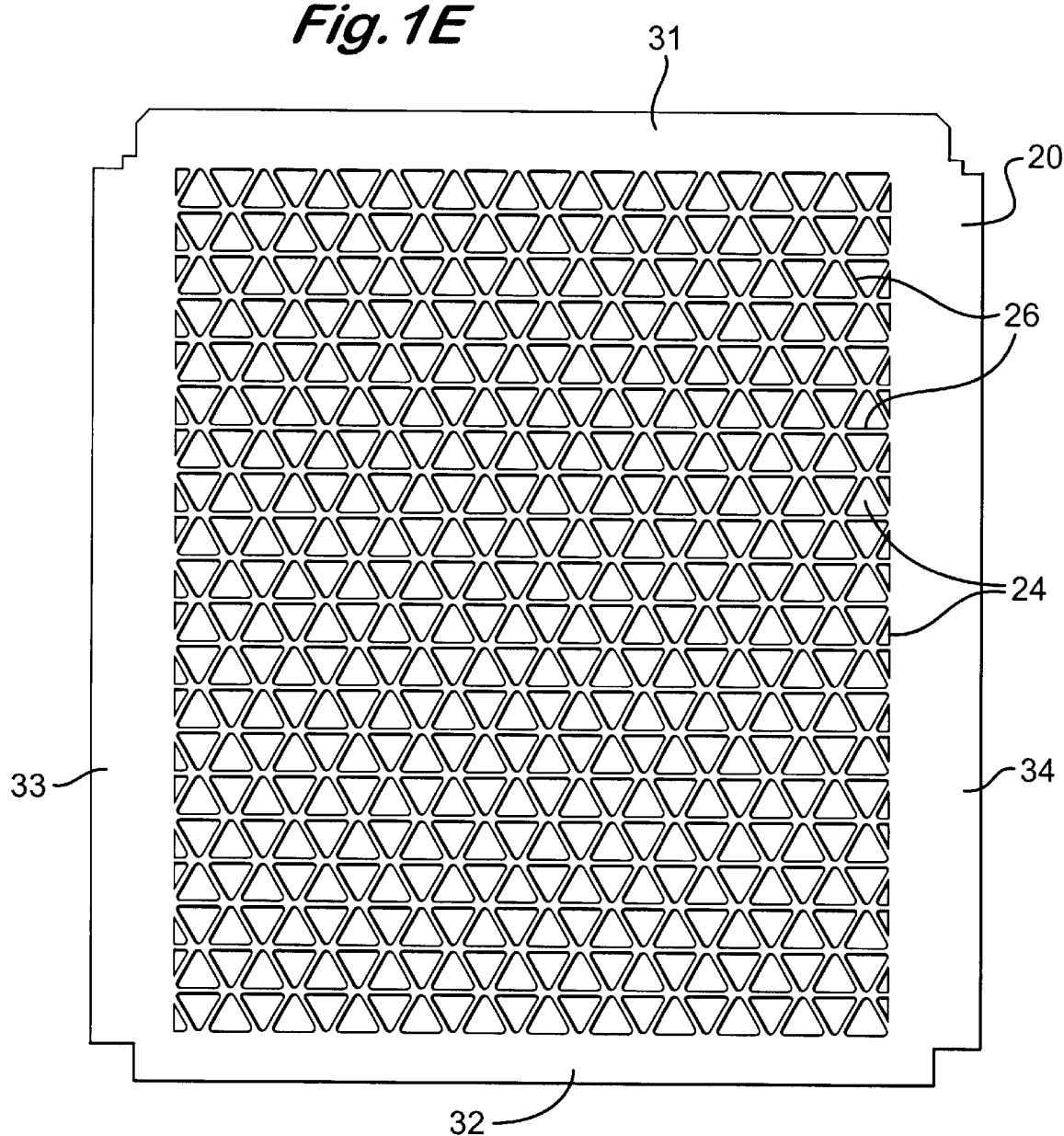
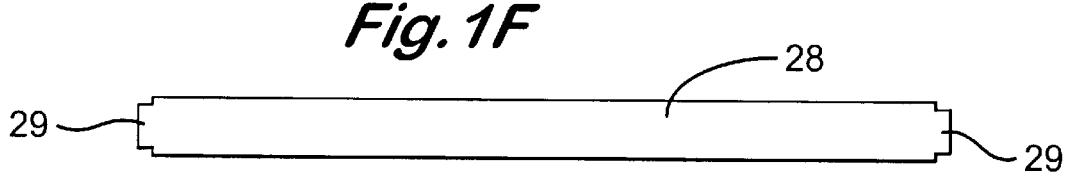

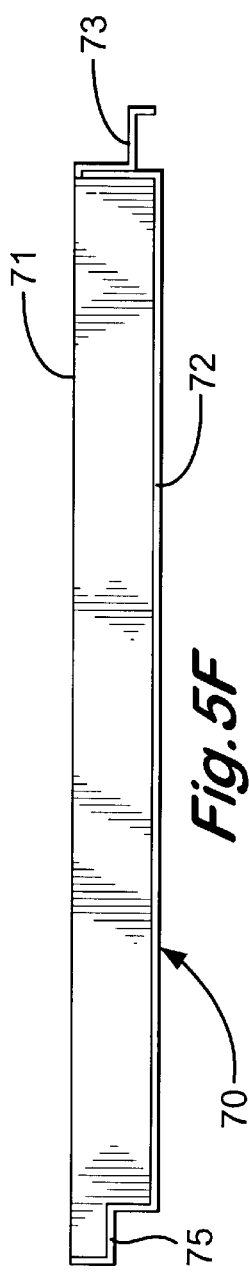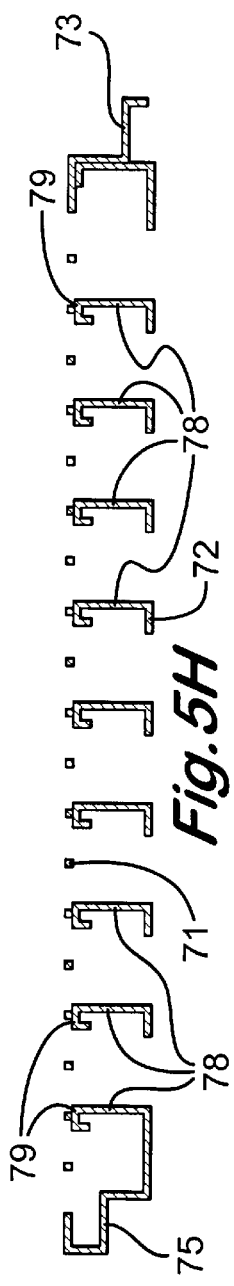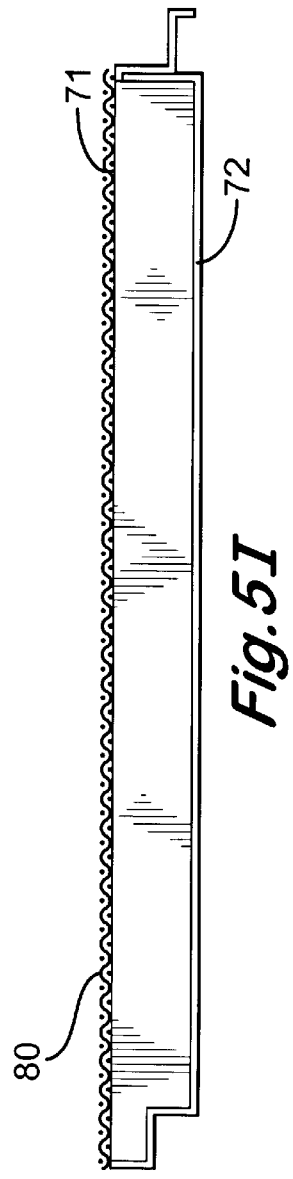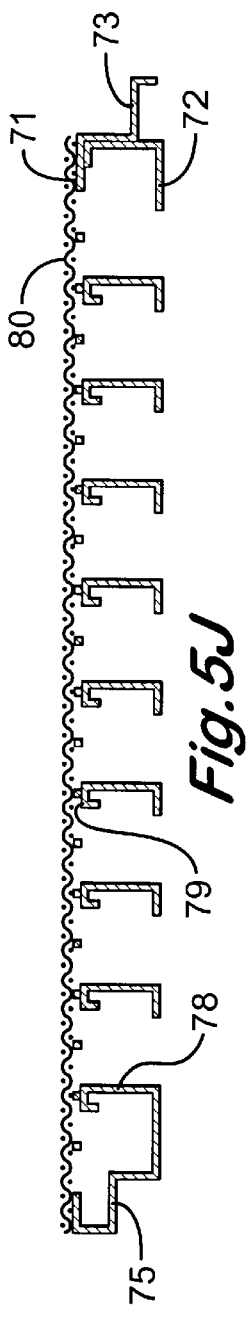

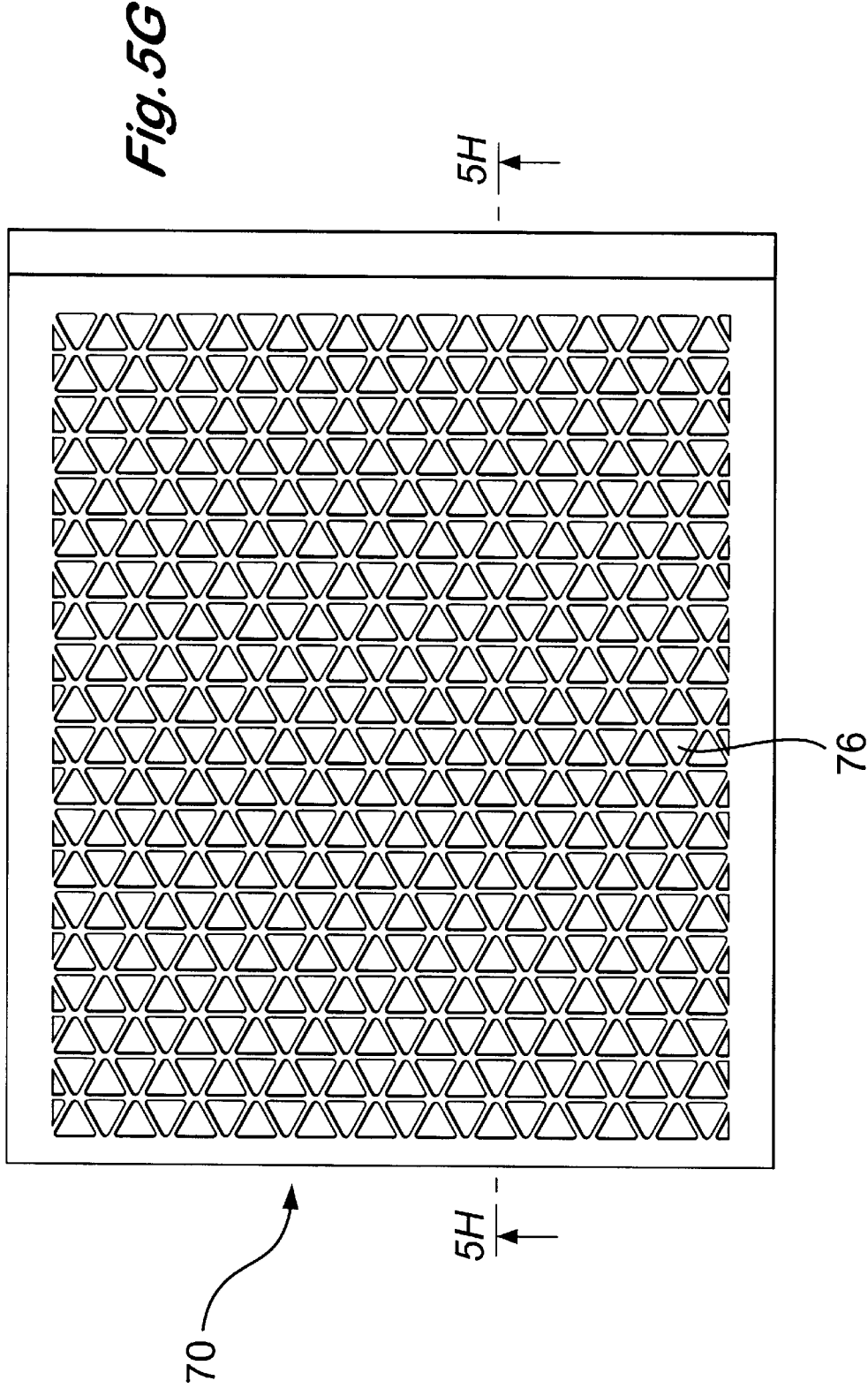

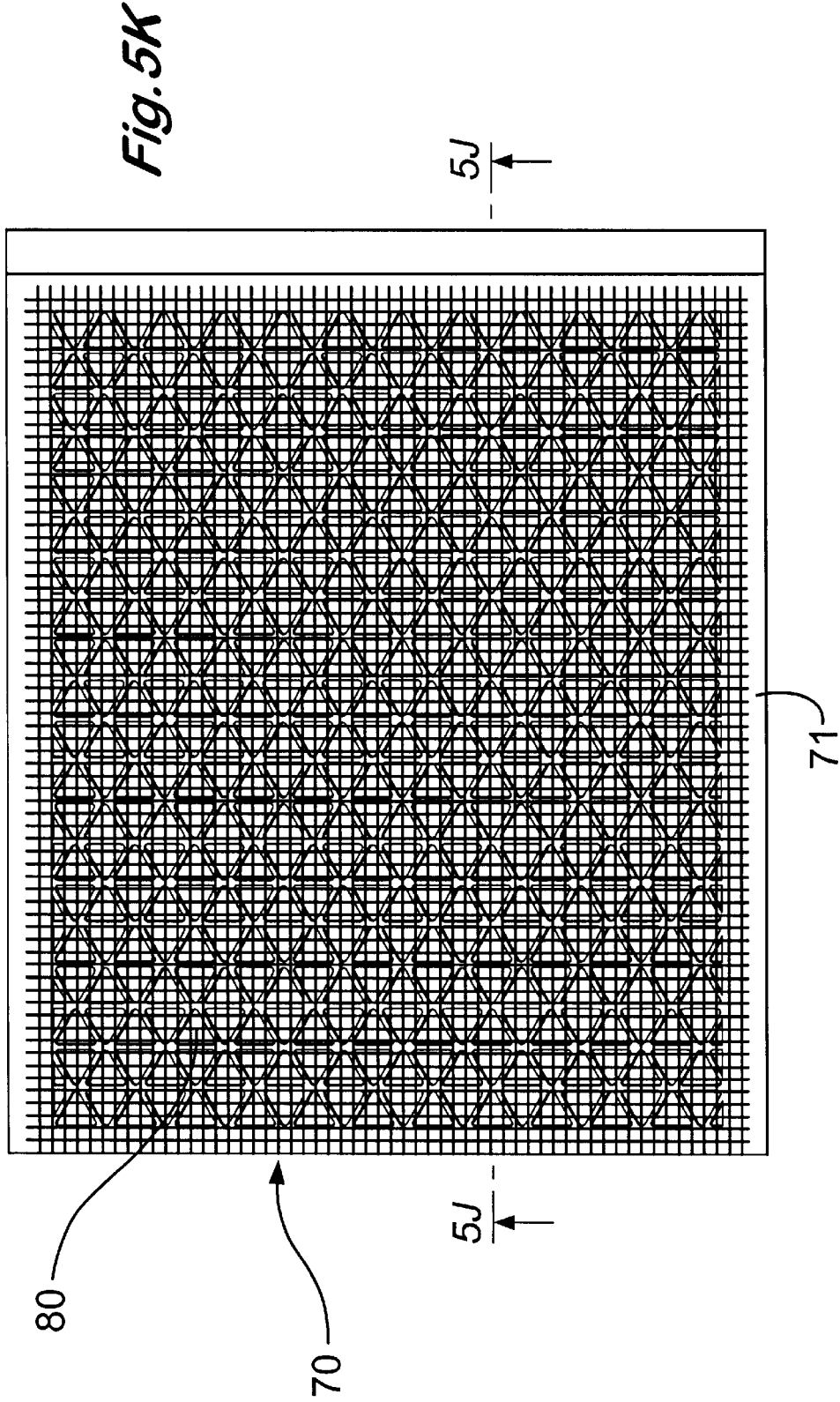

UNIBODY SCREEN STRUCTURE

RELATED APPLICATIONS

This is a continuation-in-part of U.S. application Ser. No. 09/228,572 filed Jan. 11, 1999 which is a continuation-in-part of U.S. application Ser. No. 09/183,005 filed Oct. 30, 1998, which is a continuation-in-part of U.S. application Ser. No. 09/090,554 filed Jun. 4, 1998 entitled "Vibratory Separator Screen" which is a continuation-in-part of U.S. application Ser. No. 08/895,976 filed Jul. 17, 1997 entitled "Screen For Vibratory Shaker" issued as U.S. Pat. No. 5,988,397 on Nov. 23, 1999 which is a continuation-in-part of U.S. application Ser. No. 08/786,515 filed Jan. 21, 1997 entitled "Screen For Shale Shaker" issued as U.S. Pat. No. 5,971,159 on Oct. 26, 1999 and of U.S. application Ser. No. 08/598,566 filed Feb. 12, 1996, now abandoned, entitled "Screen For Vibrating Separator." U.S. application Ser. No. 08/786,515 is a continuation in part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571 filed Oct. 25, 1993, now U.S. Pat. No. D 366,040 issued on Jan. 9, 1996 which is a continuation-in-part of U.S. applications: Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 entitled "Shale Shaker Screen" issued as U.S. Pat. No. 5,598,930 in Feb. 4, 1997; U.S. Ser. No. 08/598,566 filed Feb. 12, 1996 now abandoned entitled "Screen For Vibrating Separator" which is a continuation-in-part of U.S. Ser. No. 08/220,101 filed Mar. 30, 1994 now U.S. Pat. No. 5,490,598 issued Feb. 13, 1996. All of these related applications and patents are incorporated herein in their entirety for all purposes.

BACKGROUND OF THE INVENTION

1. Field of the Invention

The present invention is directed to frames, support structures, and panels for screens for vibratory shakers, screens with such a frame support, or panel, and methods of their use.

2. Description of Related Art

The prior art discloses a wide variety of vibrating screens, devices which use them, shale shakers, and screens for shale shakers and vibratory separators. The screens catch and remove entrained solids from fluid, drilling fluid, and/or drilling mud as it passes through them.

Various prior art screens have one, two or more overlying layers of screening material, mesh, and/or screen cloth which may be bonded together. A support, supports, or a perforated or apertured plate is often used beneath the screen, mesh or screens of many prior art screen assemblies. Also an outer frame is used in many screens. The frame may include one or more crossmembers extending across the frame and connected at the ends to sides of the frame. The frame facilitates connection of the screen to a separator device and provides support for the plate and screening material.

SUMMARY OF THE PRESENT INVENTION

The present invention discloses, in certain embodiments, a unibody structure for a screen for a vibratory separator and a screen assembly with such a structure. In certain aspects, the unibody structure is made from a single piece of material and a pattern of openings is made through it that perform a screening function. Such a structure may have no additional screening material on it or it may serve as a support for mesh and/or screening material—without, in some aspects, the need for additional screen support, an additional support plate, or an additional series of support pieces or strips. In certain embodiments the single piece of material includes portions that are foldable or bendable to form hook strips and/or a shoulder or ledge end for sealing end-to-end abutment of two screens and/or support ribs for supporting another portion in which there is a pattern of openings. In another aspect the unibody structure is foldable or bendable to form a single large opening defined by four resulting sides of the unibody structure.

In certain embodiments, the screen with a unibody structure according to the present invention has one, two, three or more upper layers of screen, screen cloth, and/or mesh. The one or more layers may be bonded to the unibody structure. If more than one layer is used, they may be bonded together at discrete points, at discrete areas, or over their entire surface. The layer or layers are mounted on the unibody structure. The unibody structure may, in certain aspects, include one or two interconnected pairs of spaced-apart integral sides in a generally rectangular configuration. Hook strips or other mounting structure may be provided on opposed sides of a unibody structure according to the present invention which are formed of integral portions of the original single piece of material.

The unibody structure may be made of any suitable plastic or metal, including, but not limited to, steel, stainless steel, aluminum, aluminum alloys, zinc, zinc alloys, PTFE, or some combination thereof.

The present invention, in certain embodiments includes a shale shaker or vibratory separator with one or more screen assemblies with a unibody structure according to the present invention.

It is within the scope of this invention to provide a screen as disclosed in U.S. Pat. Nos. 6,000,556; 5,958,236; 5,944,993; 5,876,552; 5,888,929; 5,713,077; 5,720,881; 5,673,797; 5,417,793; 5,417 858; and 5,417,859, but to delete the apertured plate of these patents and to use instead a unibody structure as disclosed herein.

In certain aspects according to the present invention, a single piece of material is used to form a four-sided support or frame for screening material (one, two, three or more layers) and/or for a plate or sheet with holes therethrough.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, non-obvious unibody screen frames, screen assemblies with such a frame, shale shakers and vibratory separators with such screens, and methods of their use;

Screen assemblies with a unibody structure which require no support for screening material other than the unibody structure;

A unibody structure with a plurality of openings therein that define a series or pattern of supporting members for screening material thereon; and Such a unibody structure also including one or more support rib portions or a series of a plurality of spaced-apart support rib portions.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1B is a top view of part of the screen assembly of FIG. 1A.

FIG. 1C is a side view of the screen assembly part shown in FIG. 1B.

FIG. 1D is a cross-section view along line 1D—1D of FIG. 1B.

FIG. 1E is a flattened out view of the screen assembly part of FIG. 1B.

FIG. 1F is a flattened out view of part of the screen assembly of FIG. 1A.

FIG. 1G shows two screens as in FIG. 1D end-to-end.

FIG. 5F shows the piece of material with part folded or bend over onto the other part.

FIG. 5G is a top view of the piece of material of FIG. 5F and

FIG. 5H is a view along line 5H—5H of FIG. 5G.

FIGS. 5I (side view), 5J (cross-section view along line 5J—5J of FIG. 5K) and 5K (top view), show screening material on the piece of material of FIG. 5H.

DESCRIPTION OF EMBODIMENTS PREFERRED AT THE TIME OF FILING FOR THIS PATENT

Figure 1A:
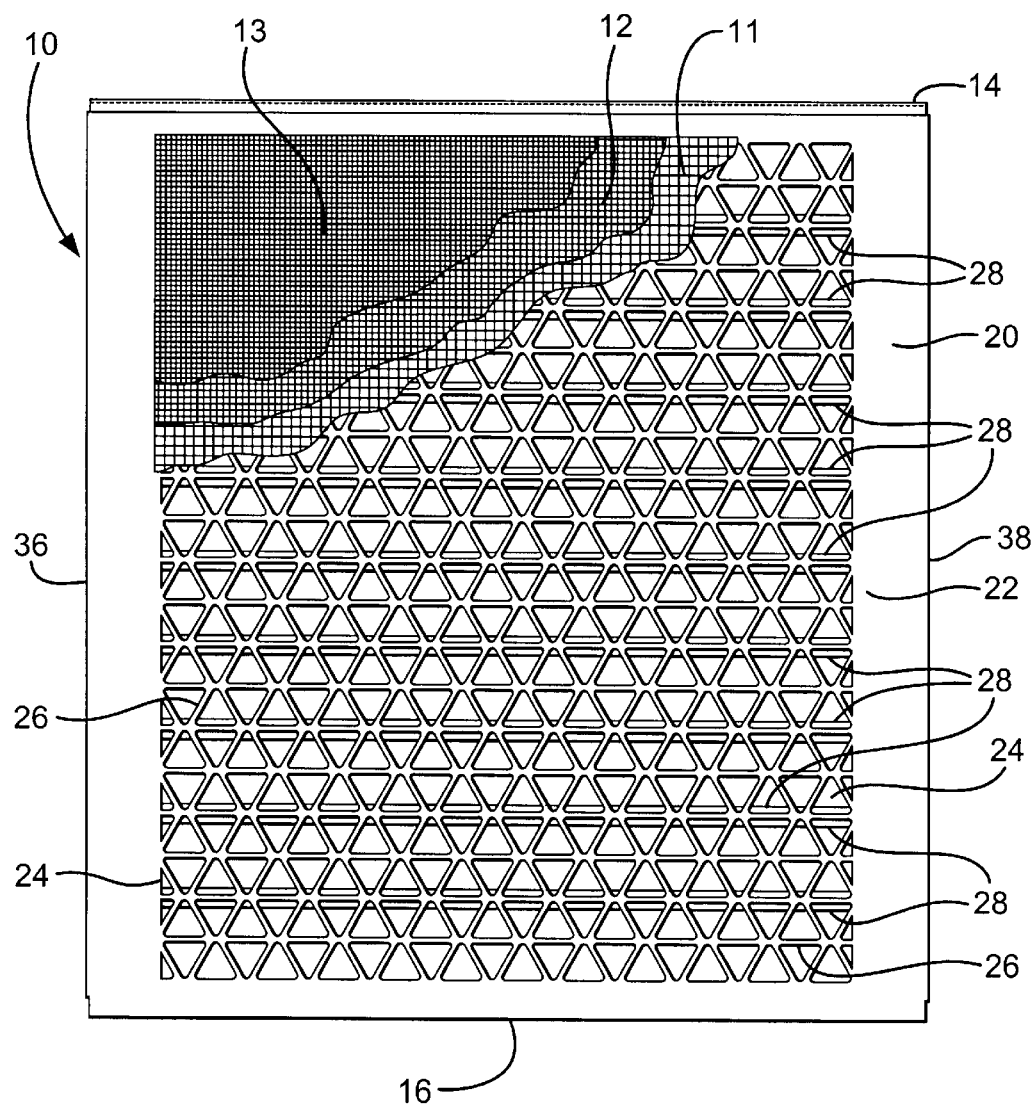
FIG. 1A is a top view of a screen assembly according to the present invention.

FIGS. 1A–1F show a screen assembly 10 according to the present invention with a unibody structure 20 according to the present invention. The screen assembly 10 has, optionally, three layers 11, 12, 13 of screening material bonded to a top surface 22 of the unibody structure 20. Preferably, the layers 11, 12, 13 are also bonded together over substantially their entire surface area.

A plurality of openings 24 through the unibody structure 20 define a plurality of support members 26. To the underside of the unibody structure 20 are, optionally, connected a plurality of spaced-apart ribs 28 which, in one aspect are welded to a metal unibody structure 20. In this particular embodiment the ribs 28 are positioned along a substantial majority of their length directly beneath one of the support members 26 that extend across a major portion of the unibody structure 20; but it is within the scope of this invention to use no such ribs or to position them anywhere on the underside of the unibody structure 20. The unibody structure 20 has spaced-apart sides 36, 38.

As shown in FIG. 1C, the screen assembly 10 has an end 14 and a "ledge" end 16. The ledge end has an upper ledge portion 17 that rests on a shoulder 15 of an end 14 of an adjacent screen. Thus one screen end 16 seals against another screen end 14 when such screens are used end-to-end, as shown in FIG. 1G. In one particular embodiment four screens as in FIG. 1D are used on a shaker in two end-to-end pairs with the pairs side by side. Each pair is positioned in "C" channels. One of the screens is moved into the "C" channel supports ledge end 16 first. Then the ledge end 16 of the second screen is moved into the "C" channels so that it sealingly abuts the end 14 of the first screen. The other pair is similarly installed.

As shown in FIG. 1E, the unibody structure 20 is, initially, a single integral piece of material in which the pattern of openings 24 is formed, e.g. by any suitable cutting tool, punch, laser, or plasma beam or arc. Alternatively, the area shown in FIG. 1E with the openings 24 may be removed so that all that is formed according to the present invention is a four-sided structure to which is applied one, two, three or more layers of screening sheet(s) and/or screening material; including but not limited to a perforated sheet or plate and/or any desired number of layers of screening material, bonded or unbonded.

Extensions 31, 32, 33, and 34 are folded to form, respectively, the end, 14, end 16 and sides 36, 38. It is within the scope of this invention to fold the various extensions of the unibody structure with any suitable press brake, pliers, or bending device with or without applying heat to the structure. FIG. 1F shows a rib 28 which has not yet been bent or folded into the form shown in FIG. 1D. Ends 29 may be introduced into corresponding holes or slots (not shown) in the sides 36, 38 to facilitate securement of the ribs.

It is within the scope of this invention for the screen assembly 10 to have none, one, two, three or more layers of screening material, i.e., screen, mesh, and/or cloth made, e.g., of stainless steel wire and/or plastic. Any such layer or combination of layers may be bonded together (glued, welded, and/or sintered) in any known manner and/or bonded to the unibody structure 20 in any known manner. Any such layer or layers of screening material may be substantially flat or may be undulating (with a series of alternating ridges and valleys) as is well known in the art.

Figure 2:
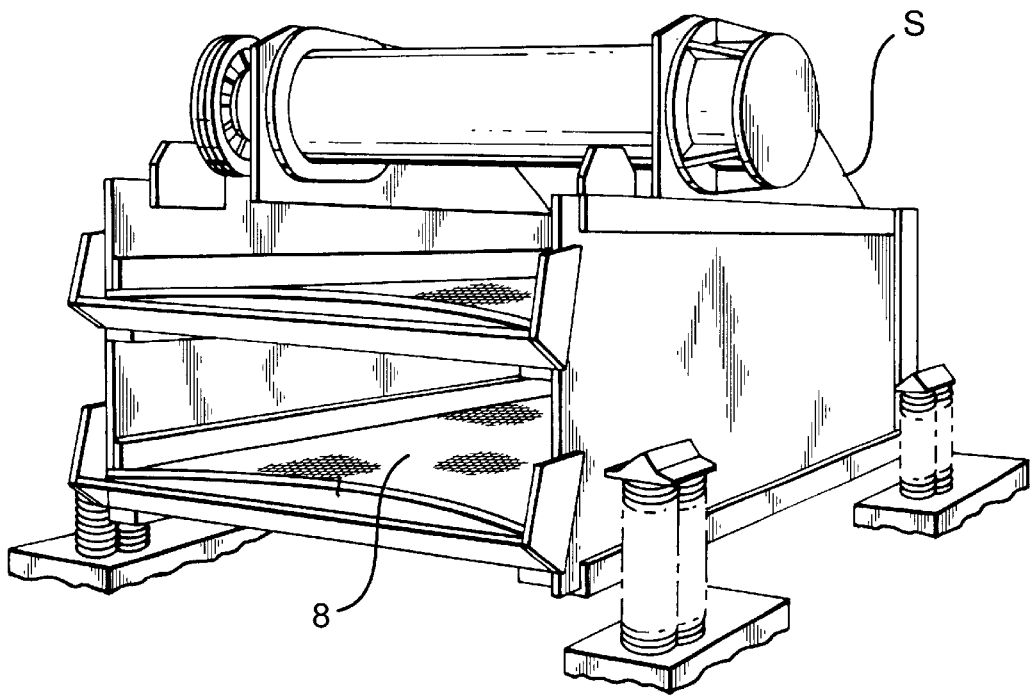
FIG. 2 is a perspective view of a shale shaker according to the present invention with a screen assembly according to the present invention.
Figure 4A:
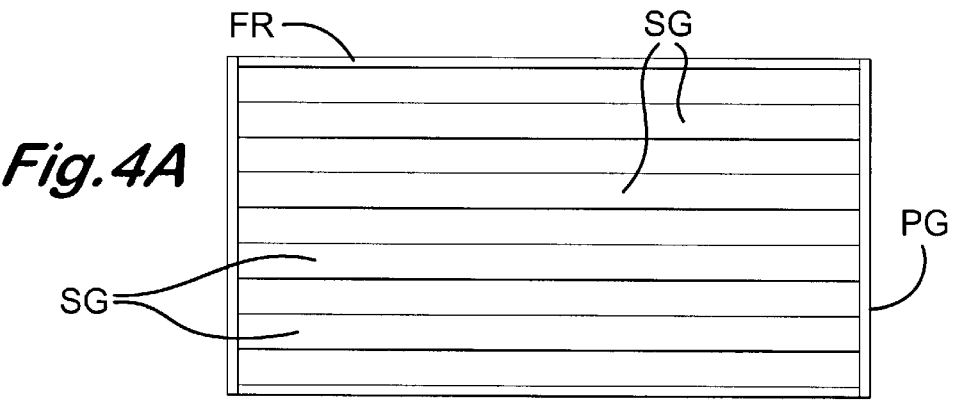
FIGS. 4A–4J are top views of patterns of openings that may be provided in a unibody frame according to the present invention.
Figure 4B:
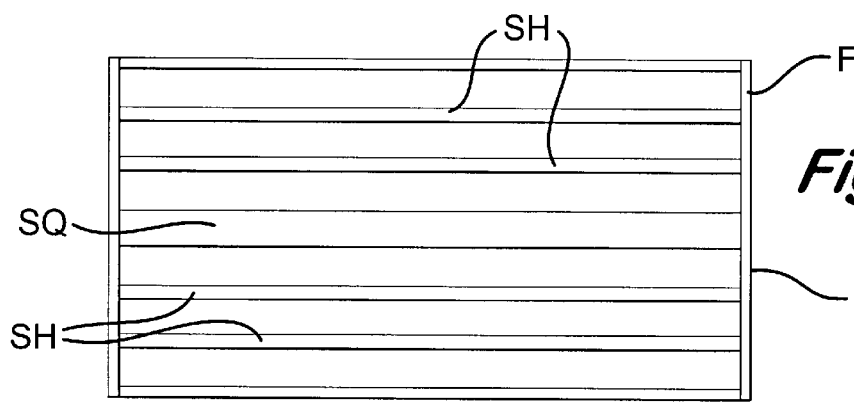

FIG. 2 shows a shale shaker S according to the present invention with a screen assembly 8 according to the present invention which may be any screen assembly disclosed herein according to the present invention. Any suitable known shaker or vibratory separator may employ one or more screens according to the present invention including but not limited to shakers as disclosed in U.S. Pat. Nos. 5,392,925 and 5,641,070 and in the references cited in each patent.

Edges on both sides of a unibody structure according to the present invention can form hook strips. In such an embodiment with hook strips a hook end (like the hook end 14), FIG. 1C) and/or a ledge end (like the ledge end 16, FIG. 1C) may be deleted.

FIGS. 3A–3G are top views of alternative embodiments for the unibody structure F, each with a series of different-shaped openings 41, 42, 43, 44, 45, 46, 47 therethrough, respectively. Instead of placing sheets or layers of screening material over the openings, it is within the scope of this invention to emplace a plug or module with screening material in some or all of the openings of any screen assembly disclosed herein according to the present invention. In certain aspects, the plugs or modules are as disclosed in U.S. Pat. Nos. 5,988,397 or 5,490,598, parents of this case.

Figure 3A:
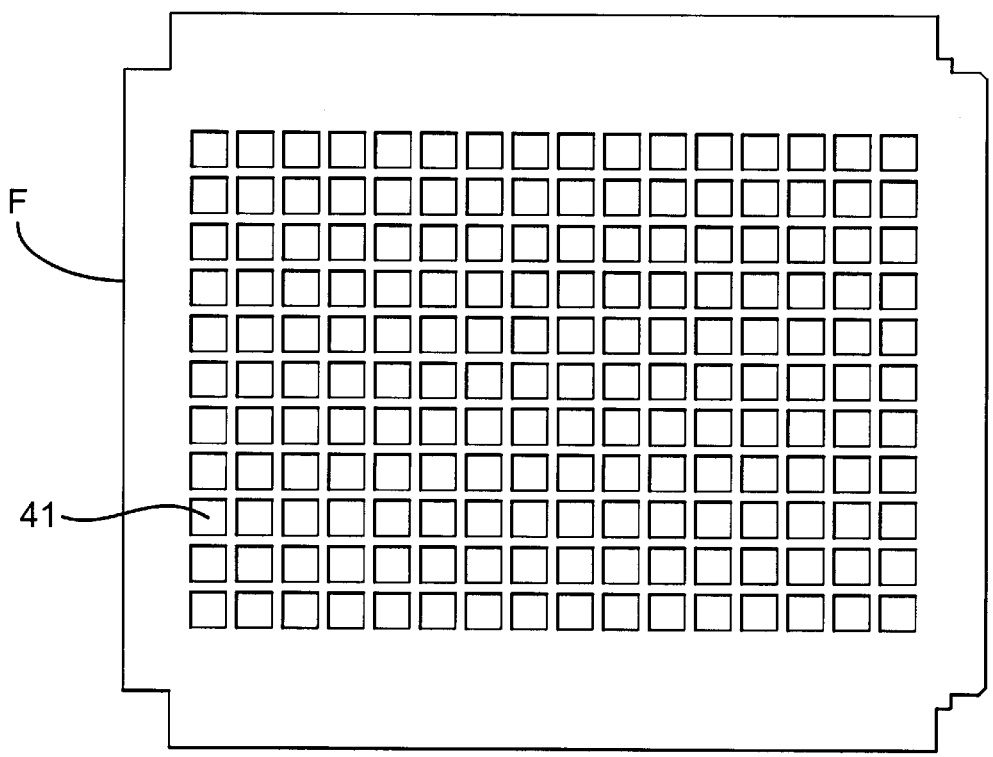
FIGS. 3A–3G are top views of alternative embodiments for a part like the part of FIG. 1B of a screen assembly according to the present invention.
Figure 3B:
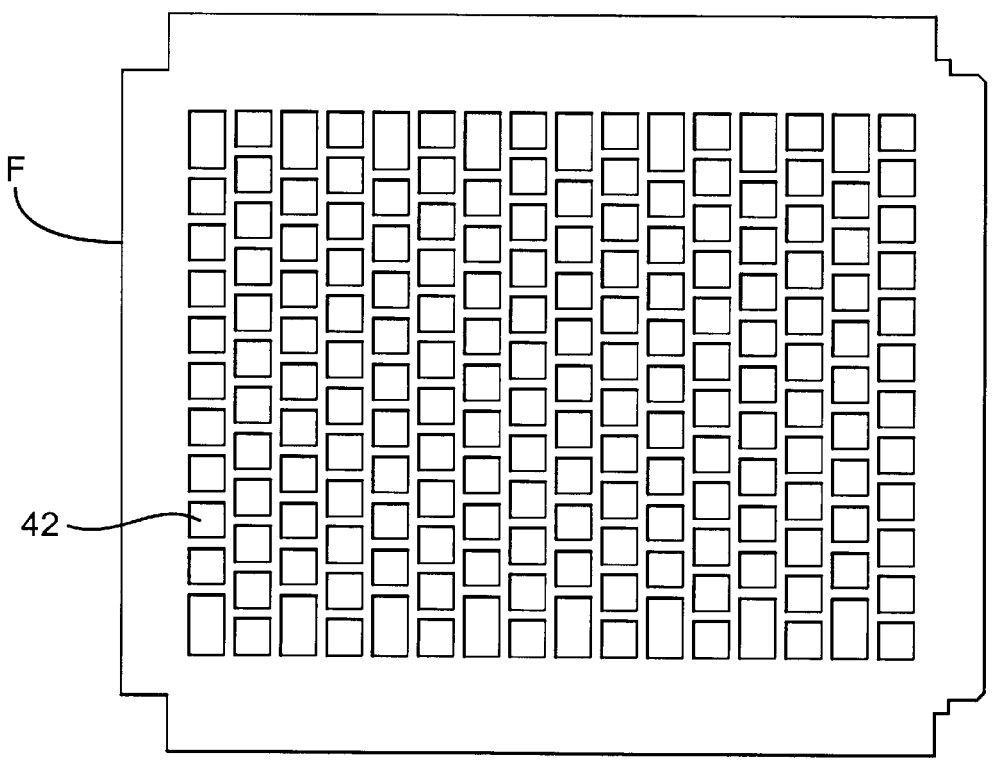
Figure 3C:
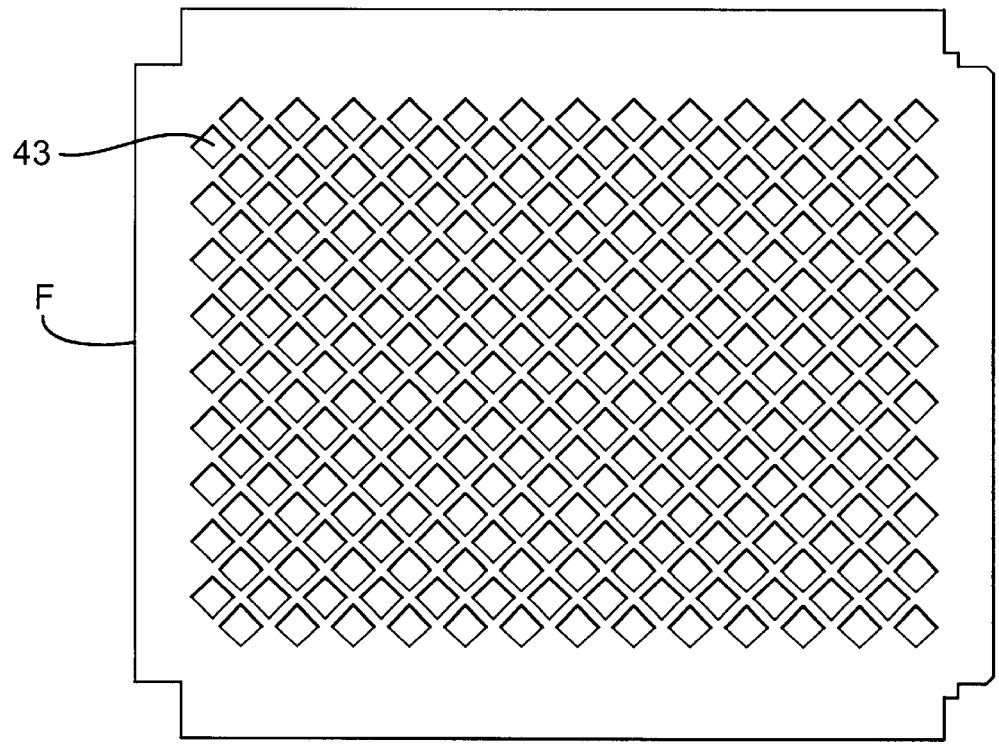
Figure 3D:
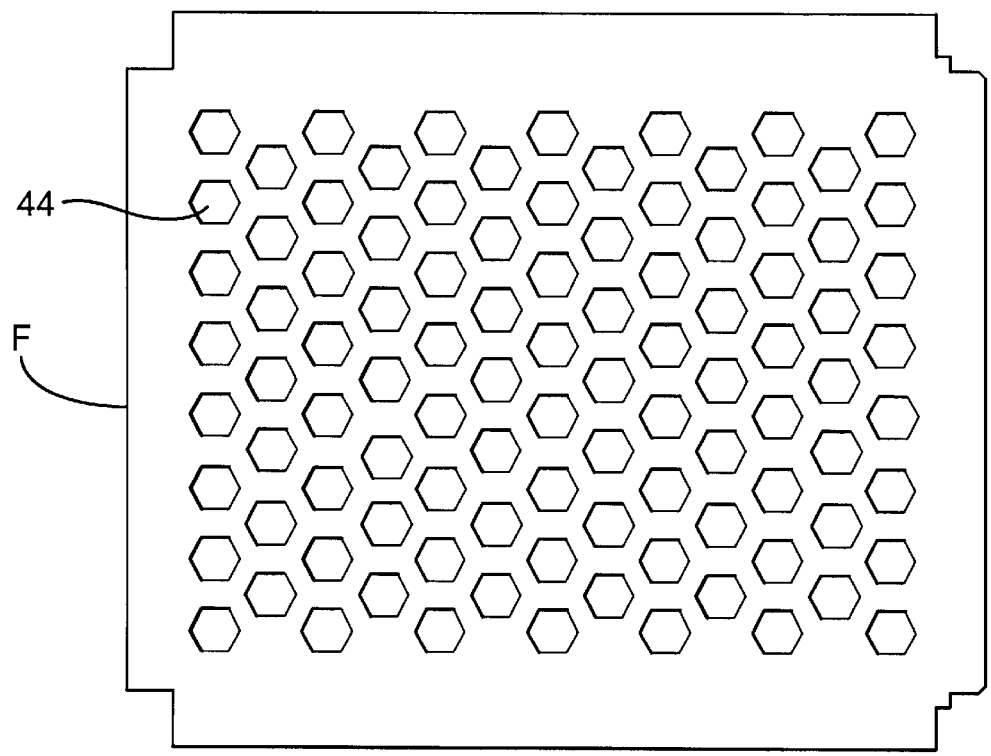
Figure 3E:
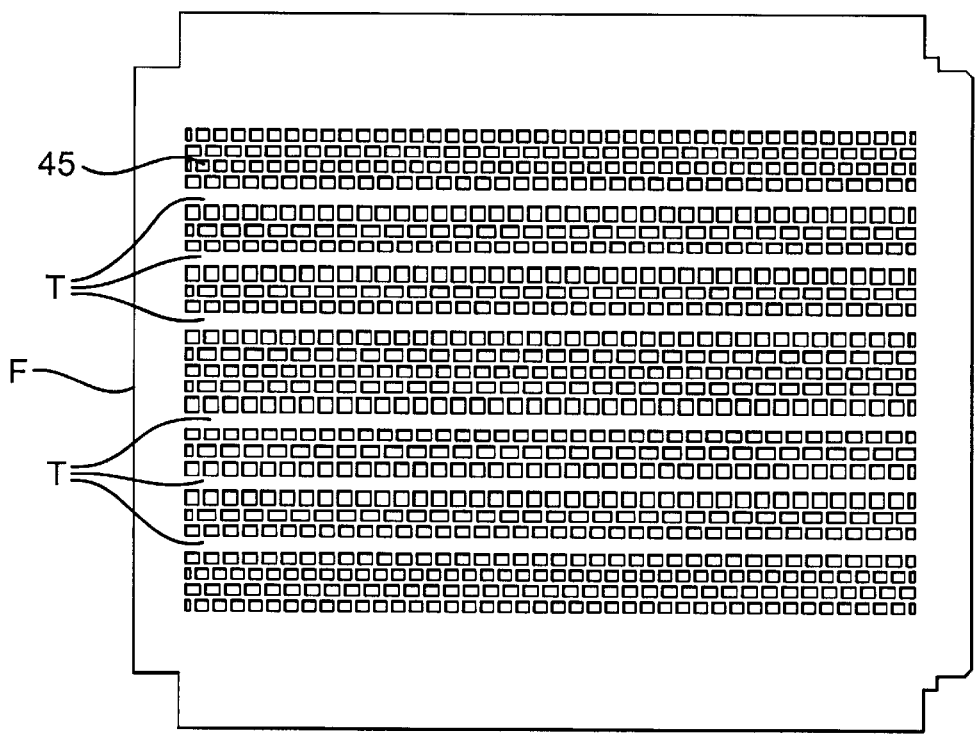
Figure 3F:
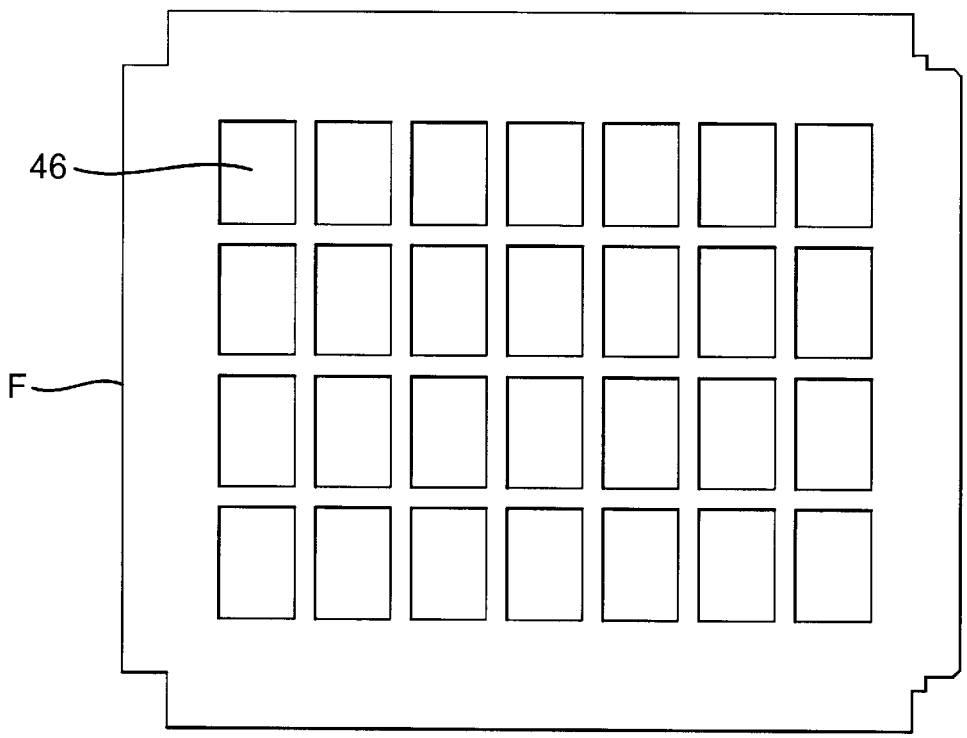
Figure 3G:
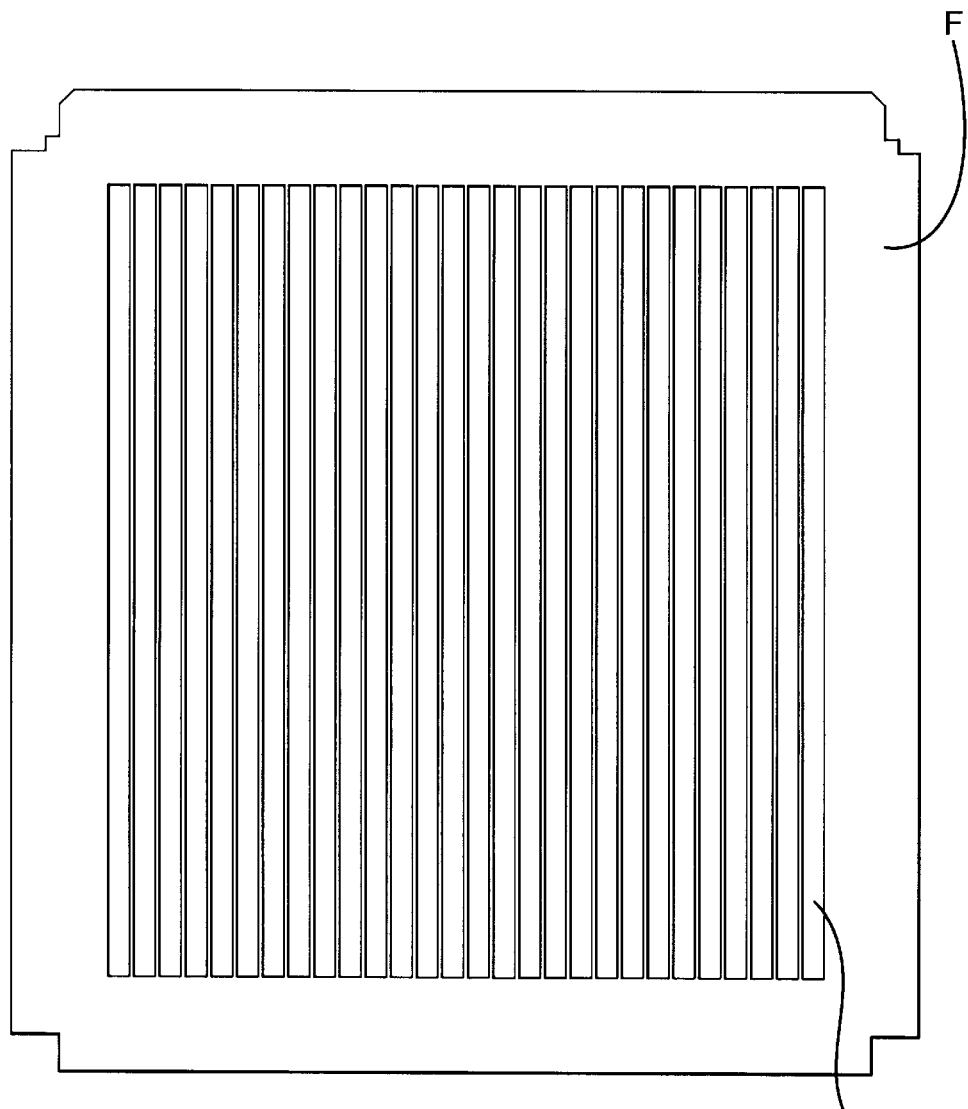
Figure 4C:
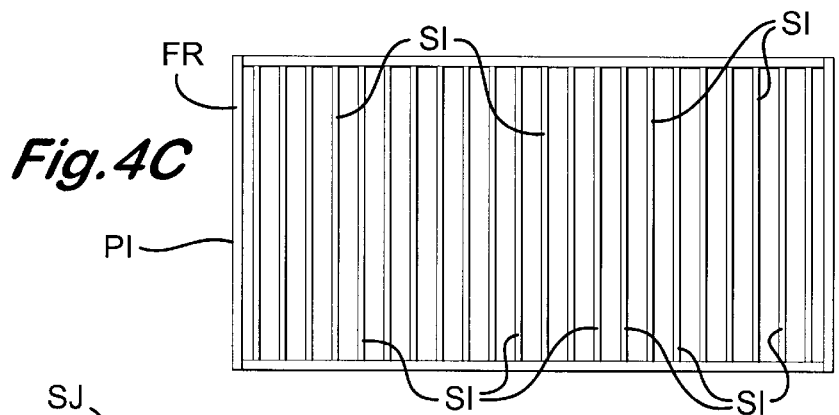
Figure 4D:
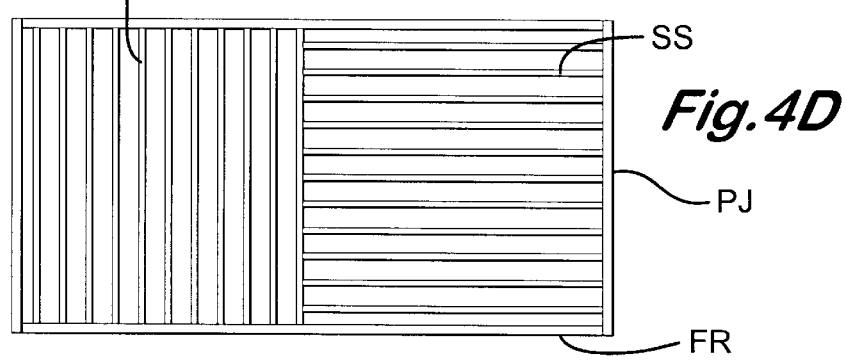
Figure 4E:
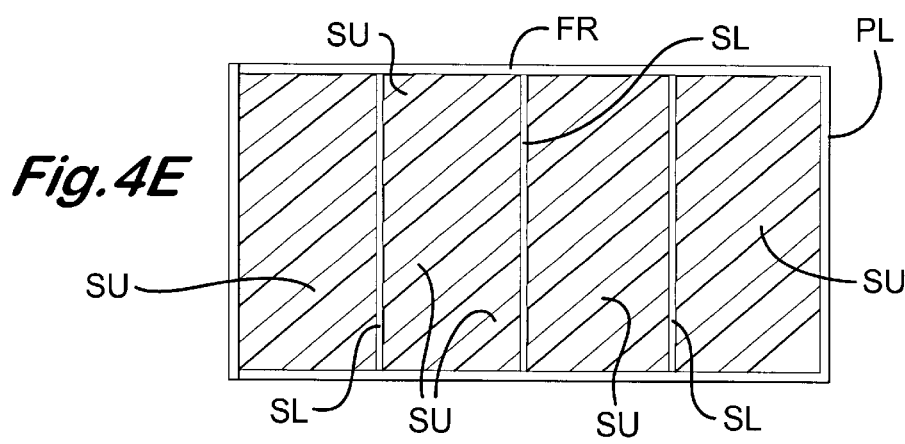
Figure 4F:
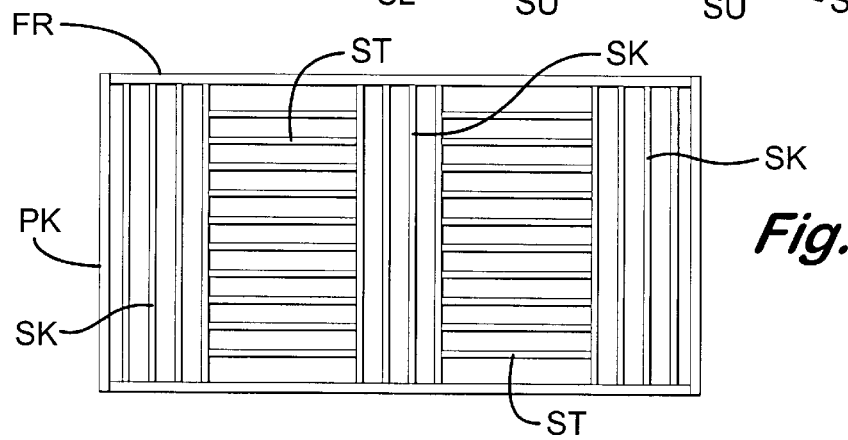
Figure 4G:
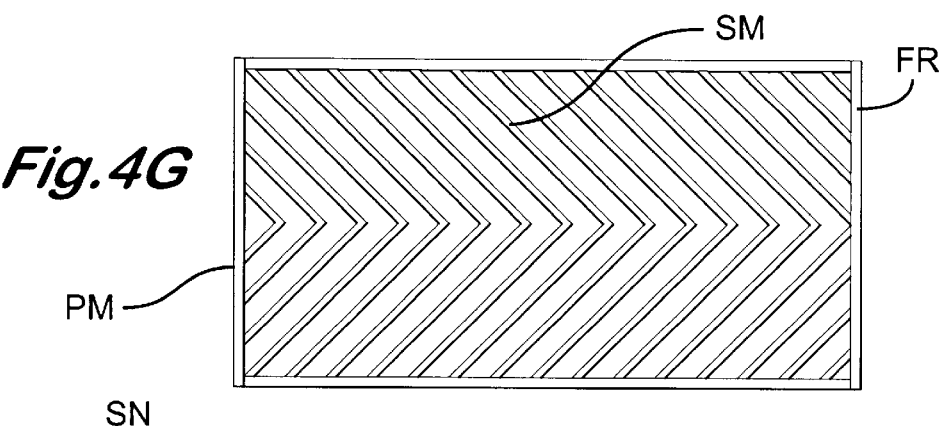
Figure 4H:
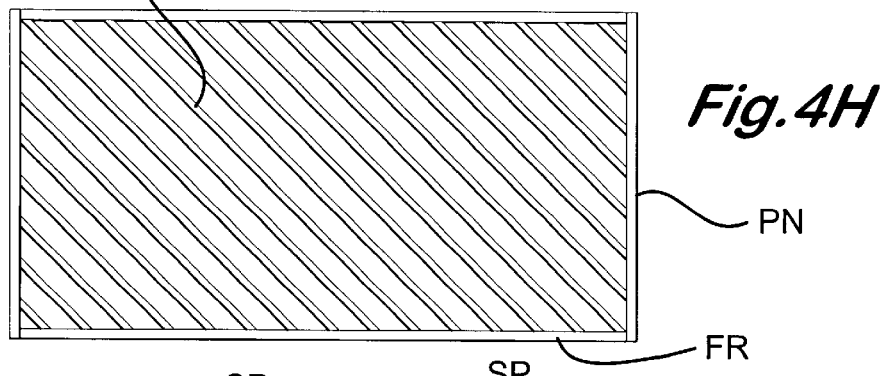
Figure 4I:
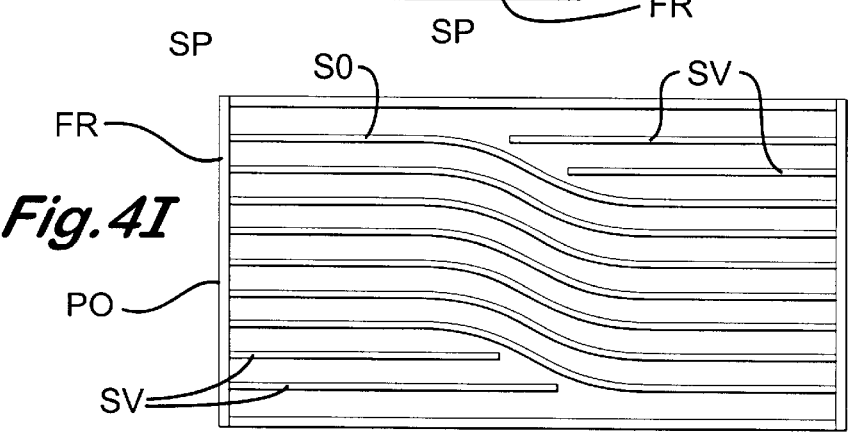
Figure 4J:
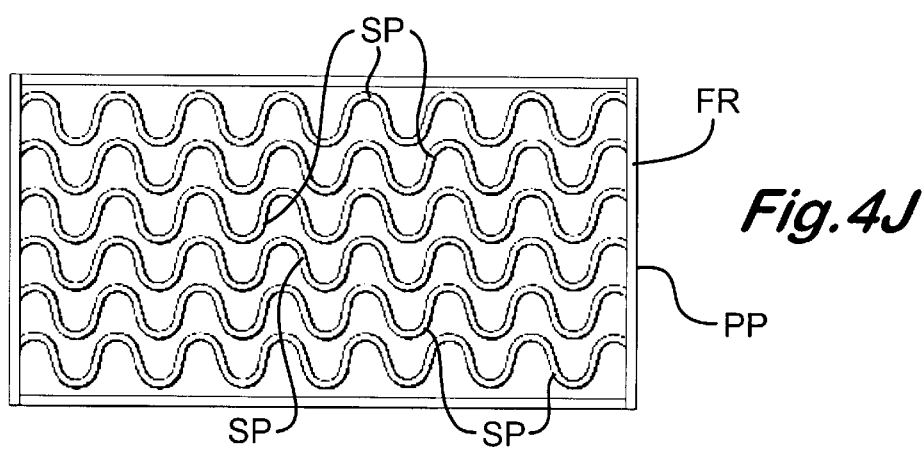

Also, e.g. as shown in the embodiment of FIG. 3E, it is within the scope of this invention to provide one or more areas or strips T without openings.

FIGS. 4A–4J replicate the panels disclosed in FIGS. 45G–45P of pending U.S. application Ser. No. 288,572, filed Jan. 11, 1999, a parent of this case, and are reproduced here to illustrate certain possible opening/support member patterns for a unibody structure according to the present invention. Of course if any such opening/support pattern is used in a unibody structure according to the present invention the ends and sides of the panels as disclosed in FIGS. 45G–45P of the cited application may be deleted.

In certain embodiments of a screen assembly with a unibody structure according to the present invention as described above has no separate pieces added to form parts, e.g. sides, hook strips, hook end, ledge end, etc. and is, therefore, relatively less expensive to make. By reducing or eliminating seams and connection areas, a relatively more substantial screen assembly is possible.

Figure 5A:
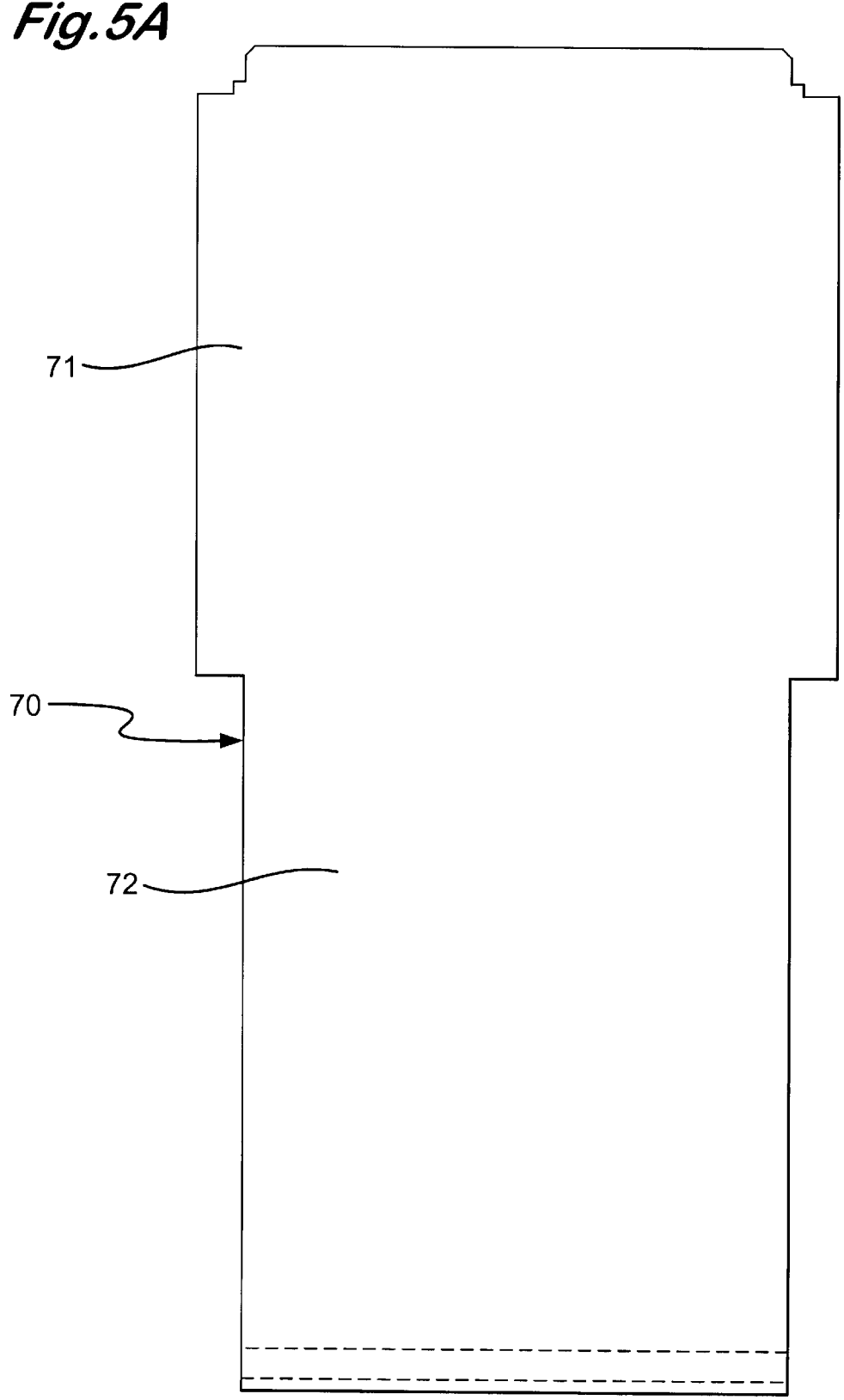
FIG. 5A is a top view of a single piece of material to be used to make a unibody structure according to the present invention.
Figure 5B:
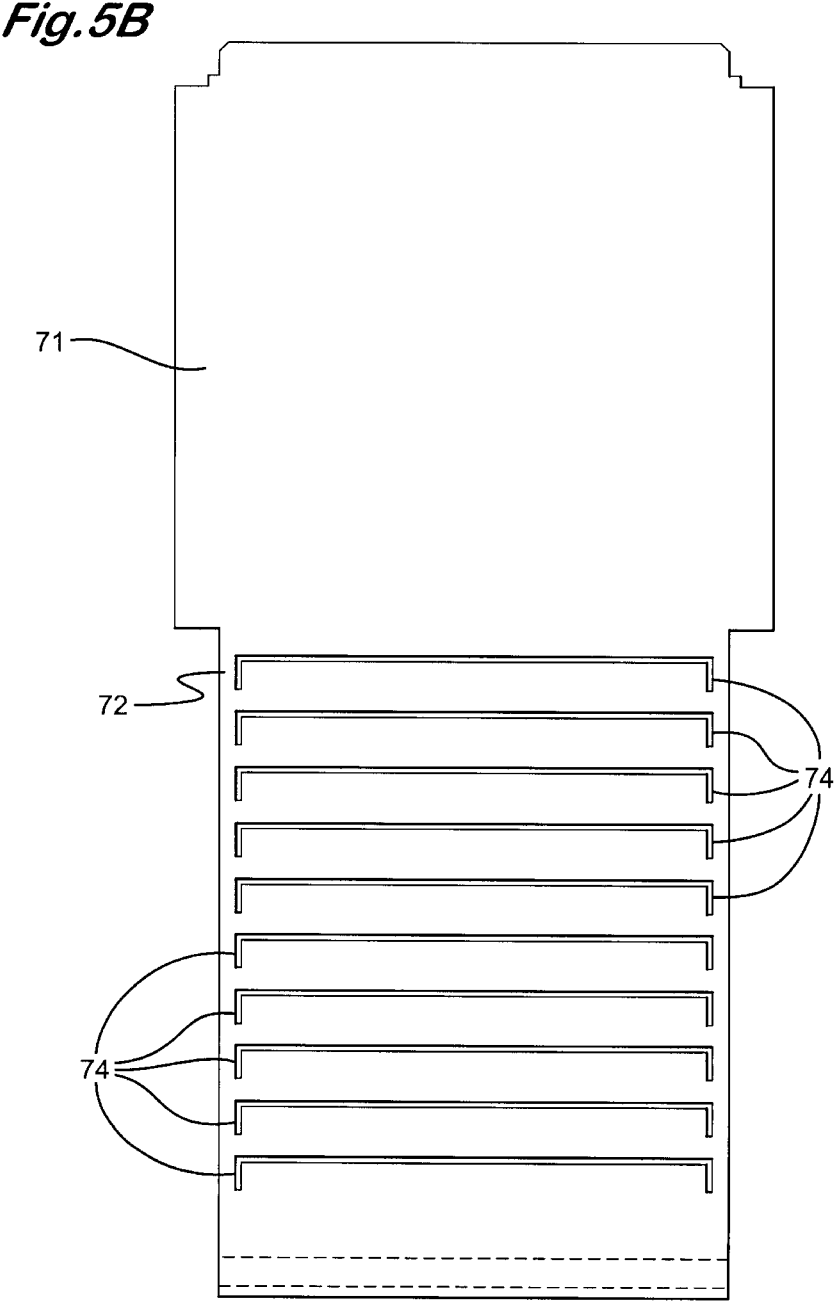
FIG. 5B shows the material of FIG. 5A with slots cut to form support ribs.

FIGS. 5A–5E illustrate a unibody structure 70 according to the present invention that is initially a single integral piece of material that is cut or machined to the shape shown in FIG. 5A that includes a first portion 71 in which will be made a pattern of openings and a second portion 72 in which will be made a series of rib supports. As shown in FIG. 5B a series of slots 74 are made (cut, drilled, punched, or machined in any suitable manner) in the second portion.

Figure 5C:
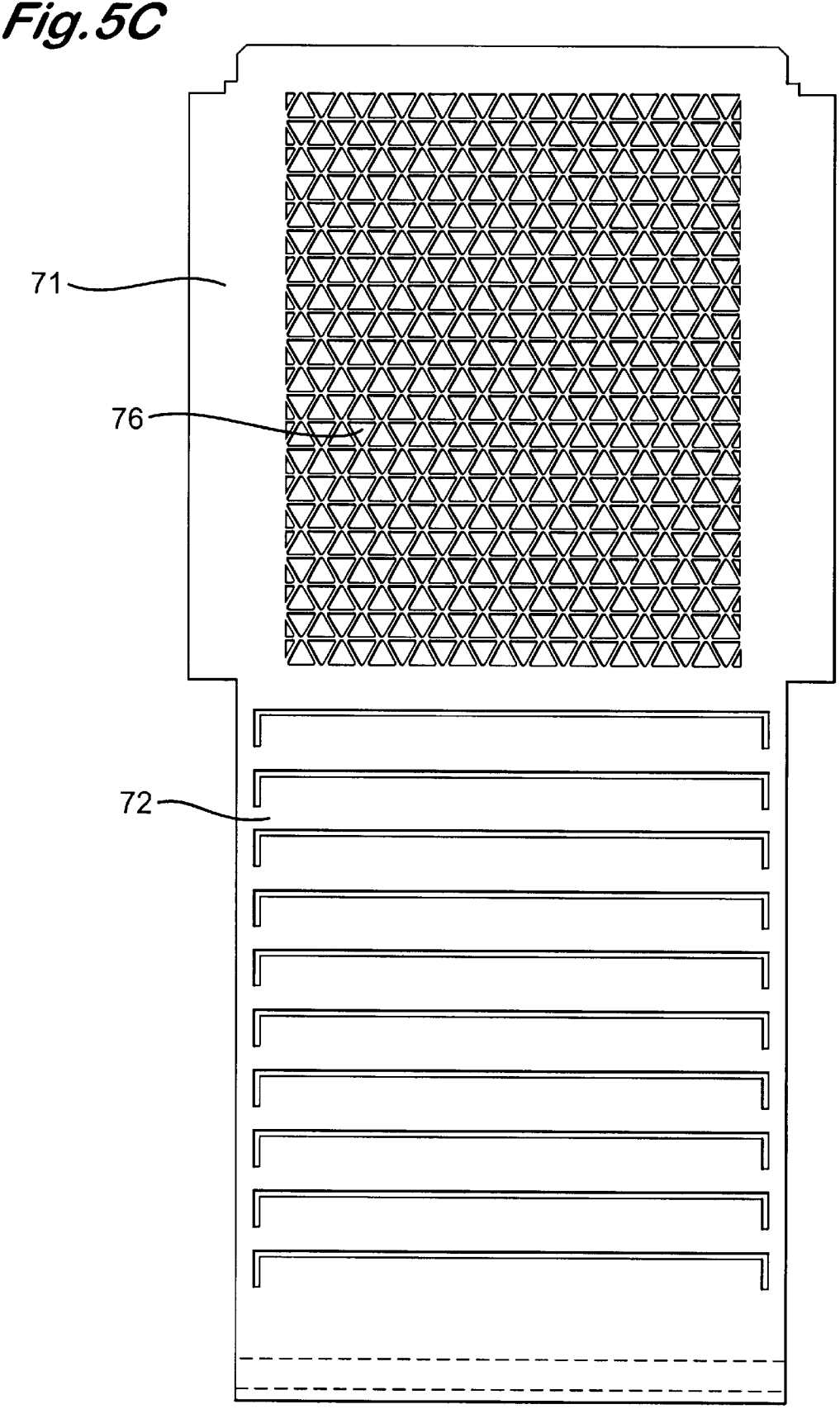
FIG. 5C shows the material of FIG. 5B with a pattern of openings.

As shown in FIG. 5C a pattern of openings 76 is made (cut, drilled, punched, or machined in any suitable manner) in the first portion 71. These openings and their pattern may be any suitable shape opening in any desired pattern, including, but not limited to, any opening shape and pattern disclosed herein. The openings 76 may be of such a size that no additional screening material is placed over them; or, alternatively, any screening material disclosed herein, bonded or unbonded, may be placed over the openings 76.

Figure 5D:
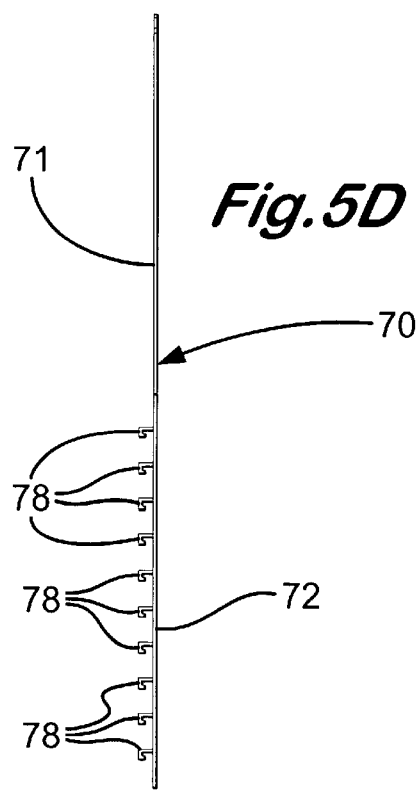
FIG. 5D is a side view of the material of FIG. 5C with support ribs now projecting from the material.
Figure 5E:
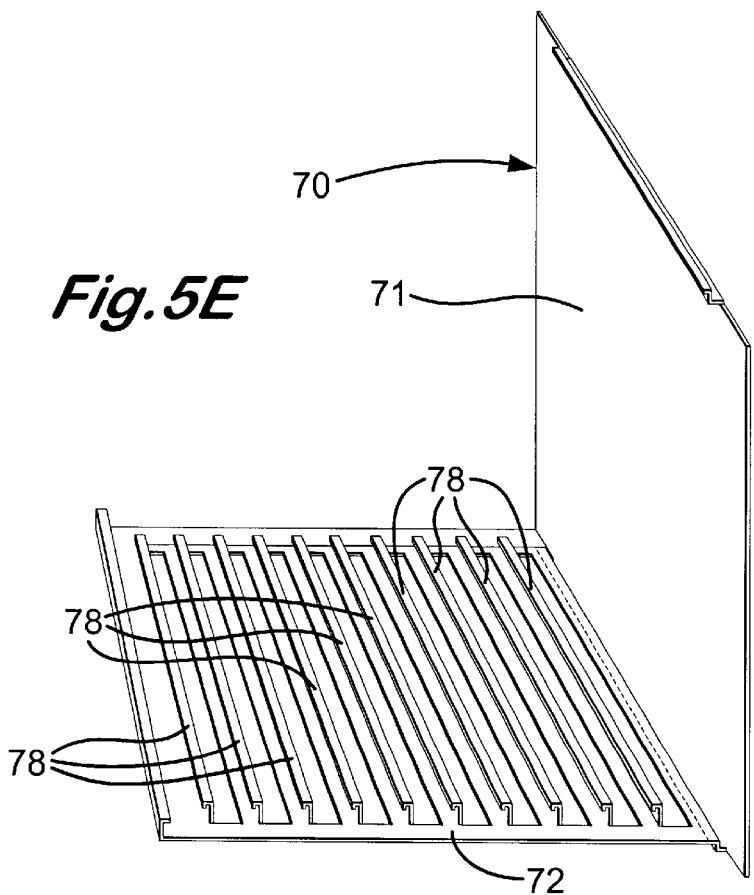
FIG. 5E shows the material of FIG. 5D with the portion with the pattern of openings at an angle with respect to the portion with the support ribs.

As shown in FIG. 5D rib supports 78 have been bent or folded away from the second portion 72. As shown in FIG. 5E the first portion 71 has been folded or bent with respect to the second portion 72. As shown in FIGS. 5F–5G the first portion 71 has been folded or bent over onto the second portion 72 so that an underside of the first portion 71 contacts top surfaces 79 of the rib supports 78. The first portion 71 may be glued, bolted, screwed, or welded to top surfaces 79 of the rib supports 78 [or Velcro™ material may be used to secure the portion 71 to the ribs 78]. FIGS. 5I–5K show the structure of FIG. 5F with screening material 80 thereon. The screening material 80 may be, in at least certain preferred embodiments, any known screen, screens, mesh, and/or meshes in any known combination, bonded or unbonded to each other, bonded or unbonded to the top portion 71, and/or of different weaves or similar weaves. As shown in FIGS. 5H and 5F the ends 73, 75 correspond, respectively, to ends 14 and 16 of the screen of FIG. 1A and function similarly to effect the sealing end-to-end abutment of such screens.

Figure 6:
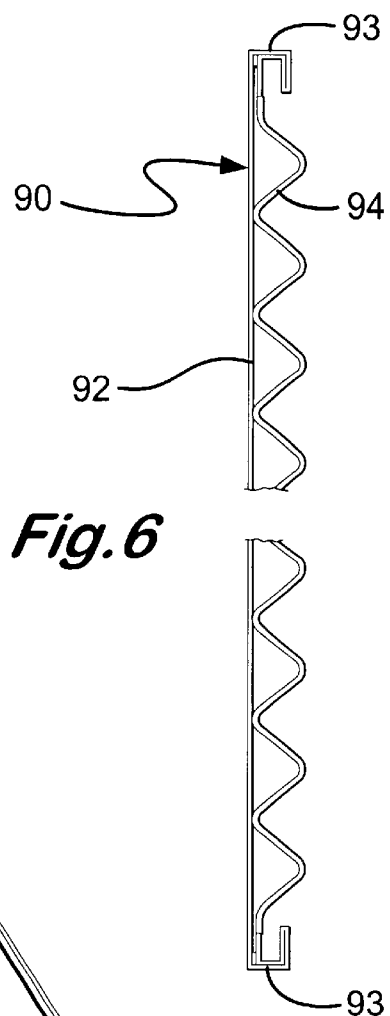
FIG. 6 is a side cross-section view of a screen assembly according to the present invention.

FIG. 6 shows a screen assembly 90 according to the present invention which has a unibody structure 92 which is substantially flat and with ends 93 folded or bent to form "hook strips" for securing the screen assembly 90 in various shakers and separators that employ such a screen connection apparatus. Such hook strips may be provided with any unibody structure disclosed herein. Such a unibody structure may be used instead of various prior art devices which employ, e.g. a plate to which channel-shaped members are welded or otherwise secured; for example, but without limitation, the unibody structure can be used in devices like those of U.S. Pat. No. 5,720,881 and 4,575,421 (and those of the references cited in these two patents) instead of the plate/channel-shaped member combinations disclosed in these patents. Screening material 94 (as any described herein with respect to layer(s), mesh(es), bonding etc.) has an undulating shape as viewed in FIG. 6. It is shown with lower parts touching and fixed to a top surface of the unibody structure 92, but it may be spaced-apart from this surface. It is within the scope of this invention to employ undulating screening material on any unibody structure and with any screen assembly disclosed herein. Optionally, the screening material 94 may be substantially flat. The unibody structure 92 may be, as viewed from above, like any unibody structure disclosed herein. In another aspect, the screening material 94 is a portion like the first portion 71 (FIG. 5A) and is folded over to a position as shown in FIG. 6, rather than affixed as a separate piece. Alternatively, what is shown as the screening material 94 in FIG. 6 may be a support structure for additional screening material placed thereon.

The present invention provides, therefore, in at least some (but not necessarily all) embodiments, a unibody structure for a screen assembly for a vibratory separator, the unibody structure including an integral body member with a portion having a plurality of spaced-apart openings therethrough defining a pattern of a plurality of spaced-apart screening openings, and the integral body member including side portions and/or end portions foldable to form a pair of spaced-apart integral side members and/or end members. Such a unibody structure may include one or some (in any possible combination) of the following: wherein one of the pair of spaced-apart end portions is configured with a shoulder support portion for sealingly abutting a screen ledge end of an adjacent screen; wherein one of the pair of spaced-apart end portions is configured with a ledge portion for sealingly abutting a shoulder portion of an end of an adjacent screen; wherein the side portions include sub-portions foldable to form a hook strip on each of two opposed sides of the unibody structure; wherein the integral body member has a plurality of spaced-apart support openings defining portions of the integral body member foldable to form a plurality of spaced-apart supports for the unibody structure; screening material over the plurality of spaced-apart screening openings; a plurality of spaced-apart support ribs connected to and beneath the portion of the integral body member with the plurality of spaced-apart screening openings; a vibratory separator (shaker, etc.) on which the unibody structure is mounted; screening material (bonded or not to the integral body member) over the plurality of spaced-apart screening openings; wherein the screening material comprises multiple layers of screening material (bonded or not to each other); wherein the plurality of spaced-apart screening openings further comprises a plurality of series of spaced-apart screening openings, each series spaced-apart from the other series by solid portions of the integral body member; and/or wherein the integral body member has spaced-apart connector portions foldable to form connection structure for securing the unibody structure to a vibratory separator apparatus.

The present invention provides, therefore, in at least some (but not necessarily all) embodiments, a unibody structure for a screen assembly for a vibratory separator, the unibody structure with an integral body member having four sides, including two pairs of spaced-apart sides, and a portion having a plurality of spaced-apart openings therethrough defining a pattern of a plurality of spaced-apart strips, and the integral body member including at least two side portions at one of the two pairs of spaced-apart sides foldable to form a pair of spaced-apart integral side members. Such a unibody structure may include one or some (in any possible combination) of the following: the integral body member including a second portion adjacent the first portion, the second portion foldable over the first portion, the second portion having a plurality of openings therethrough for fluid flow therethrough; wherein the strips of the plurality of spaced-apart strips are foldable to form support ribs for the second portion of the integral body member; vibratory separator apparatus, and the unibody structure installed on the vibratory separator apparatus and/or wherein the plurality of spaced-apart support strips are substantially parallel to each other.

The present invention provides, therefore, in at least some (but not necessarily all) embodiments, a unibody structure for a screen assembly for a vibratory separator, the unibody structure with an integral body member with a central cut-out portion, and the integral body member including side portions foldable to form two pairs of spaced-apart integral side members; such a unibody structure wherein the integral body member has spaced-apart connector portions foldable to form connection structure for securing the unibody structure to a vibratory separator apparatus; and/or such a unibody structure wherein the connection structure comprises a hook strip on each of two spaced-apart sides of the unibody structure.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A unibody structure for a screen assembly for a vibratory separator, the unibody structure comprising an integral body member with a portion having a plurality of spaced-apart openings therethrough defining a pattern of a plurality of spaced-apart screening openings, and the integral body member including a pair of spaced-apart integral side members comprising side portions folded to form the pair of spaced-apart integral side members, and a pair of spaced-apart integral end members comprising end portions folded to form the pair of spaced-apart integral end members, the pair of spaced-apart integral end members including a first end member and a second end member, wherein the first end member is configured with a shoulder support portion adapted to sealingly abut a screen ledge end of an adjacent screen, and wherein the second end member is configured with a ledge portion adapted to sealingly abut a shoulder portion of an end of an adjacent screen.

2. The unibody structure of claim 1 wherein the side portions include sub-portions folded to form a hook strip on each of two opposed sides of the unibody structure.

3. The unibody structure of claim 1 wherein the integral body member has a plurality of spaced-apart supports comprising a plurality of spaced-apart support portions folded to form the plurality of spaced-apart supports for the unibody structure.

4. The unibody structure of claim 1 further comprising a plurality of spaced-apart support ribs connected to and beneath the portion of the integral body member with the plurality of spaced-apart screening openings.

5. The unibody structure of claim 1 wherein the plurality of spaced-apart screening openings further comprises a plurality of series of spaced-apart screening openings, each series spaced-apart from the other series by solid portions of the integral body member.

6. The unibody structure of claim 1 wherein the integral body member has connection structure comprising spaced-apart connector portions folded to form the connection structure, the connection structure adapted to secure the unibody structure to a vibratory separator apparatus.

7. The unibody structure of claim 1 further comprising
a plurality of spaced-apart strips extending between the side portions.

8. The unibody structure of claim 7 wherein the plurality of spaced-apart strips comprise folded portions of the body member.

9. A unibody structure for a screen assembly for a vibratory separator, the unibody structure comprising
   an integral body member with a portion having a plurality of spaced-apart openings therethrough defining a pattern of a plurality of spaced-apart screening openings, and
   the integral body member including a pair of spaced-apart integral side members comprising side portions folded to form the pair of spaced-apart integral side members,
   a pair of spaced-apart integral end members comprising end portions folded to form the pair of spaced-apart integral end members, the pair of spaced-apart integral end members including a first end member and a second end member,
   wherein the first end member is configured with a shoulder support portion adapted to sealingly abut a screen ledge end of an adjacent screen, and
   wherein the second end member is configured with a ledge portion adapted to sealingly abut a shoulder portion of an end of an adjacent screen,
   wherein the side portions include sub-portions folded to form a hook strip on each of two opposed sides of the unibody structure,
   wherein the integral body member has a plurality of spaced-apart supports comprising a plurality of spaced-apart support portions folded to form the plurality of spaced-apart supports for the unibody structure,
   a plurality of spaced-apart support ribs connected to and beneath the portion of the integral body member with the plurality of spaced-apart screening openings,
   wherein the plurality of spaced-apart screening openings further comprises a plurality of series of spaced-apart screening openings, each series spaced-apart from the other series by solid portions of the integral body member, and
   wherein the integral body member has connection structure comprising spaced-apart connector portions folded to form the connection structure, the connection structure adapted to secure the unibody structure to a vibratory separator apparatus.

10. A screen assembly for a vibratory separator, the screen assembly comprising
    a unibody structure comprising
       an integral body member with a portion having a plurality of spaced-apart openings therethrough defining a pattern of a plurality of spaced-apart screening openings, and
       the integral body member including a pair of spaced-apart integral side members comprising side portions folded to form the pair of spaced-apart integral side members, and
       a pair of spaced-apart integral end members comprising end portions folded to form the pair of spaced-apart integral end members, the pair of spaced-apart integral end members including a first end member and a second end member,
       wherein the first end member is configured with a shoulder support portion adapted to sealingly abut a screen ledge end of an adjacent screen, and
       wherein the second end member is configured with a ledge portion adapted to sealingly abut a shoulder portion of an end of an adjacent screen, and
       screening material over the plurality of spaced-apart screen openings.

11. The screen assembly of claim 10 wherein the layers of screening material are bonded together.

12. The screen assembly of claim 10 wherein the side portions include sub-portions folded to form a hook strip on each of two opposed sides of the unibody structure.

13. The screen assembly of claim 10 wherein the integral body member has a plurality of spaced-apart supports comprising a plurality of spaced-apart support portions folded to form the plurality of spaced-apart supports for the unibody structure.

14. The screen assembly of claim 10 further comprising
a plurality of spaced-apart support ribs connected to and beneath the portion of the integral body member with the plurality of spaced-apart screening openings.

15. The screen assembly of claim 10 wherein the plurality of spaced-apart screening openings further comprises a plurality of series of spaced-apart screening openings, each series spaced-apart from the other series by solid portions of the integral body member.

16. The screen assembly of claim 10 wherein the integral body member has connection structure comprising spaced-apart connector portions folded to form the connection structure, the connection structure adapted to secure the unibody structure to a vibratory separator apparatus.

17. The screen assembly of claim 10 further comprising
a plurality of spaced-apart strips extending between the side portions.

18. The screen assembly of claim 10 wherein the plurality of spaced-apart strips comprise folded portions of the body member.

* * * * *